United States Patent [19]

Andrews

[11] 4,255,775
[45] Mar. 10, 1981

[54] ELECTROSTATIC PRECIPITATOR RAPPER CONTROL SYSTEM WITH ENHANCED ACCURACY

[75] Inventor: William W. Andrews, Cranford, N.J.
[73] Assignee: Research Cottrell, Inc., Somerville, N.J.
[21] Appl. No.: 43,030
[22] Filed: May 29, 1979
[51] Int. Cl.³ .................... B03C 3/00; H01H 47/32
[52] U.S. Cl. .................... 361/153; 361/154; 361/191; 55/112
[58] Field of Search ............... 361/153, 186, 191, 154; 55/112, 105

[56] References Cited

U.S. PATENT DOCUMENTS

| | | | |
|---|---|---|---|
| 2,858,900 | 11/1958 | Foley | 183/7 |
| 2,922,085 | 1/1960 | Drenning et al. | 361/153 |
| 3,360,902 | 1/1968 | Glaeser | 55/112 |
| 3,371,252 | 2/1968 | James | 361/154 |
| 3,487,606 | 1/1970 | Bridges et al. | |
| 3,504,480 | 4/1970 | Copcutt et al. | 55/112 |
| 3,754,379 | 8/1973 | Bridges et al. | 55/104 |
| 3,864,608 | 2/1975 | Normile et al. | |
| 3,866,533 | 2/1975 | Gilbert et al. | 101/93.14 |
| 3,893,828 | 7/1975 | Archer | 55/104 |
| 4,008,057 | 2/1977 | Gelfand et al. | 55/105 |
| 4,086,646 | 4/1978 | Lanese | 361/166 |
| 4,111,669 | 9/1978 | League | 55/112 |
| 4,120,672 | 10/1978 | Lanese | 55/112 |
| 4,155,723 | 5/1979 | Lanese | 55/112 |

Primary Examiner—J. D. Miller
Assistant Examiner—L. C. Schroeder
Attorney, Agent, or Firm—Kerkam, Stowell, Kondracki & Clarke

[57] ABSTRACT

A comprehensive multiple rapper control system controls rapping intensity with enhanced accuracy, controls a large number of rappers in any desired sequence with intensity control for each individual rapper, and includes alarm circuitry for reliably indicating open circuited and short circuited conditions in the rapper coils or in the electrical connections to the rapper coils. For enhanced accuracy, a short boost pulse of full lift energy is applied immediately prior to a lift pulse of controlled energy. The boost pulse overcomes initial rapper plunger sticking forces so that total rapper plunger lift accurately reflects the electrical energy supplied during the subsequent controlled pulse. Advantage is taken of the relatively constant boost pulse which is supplied to every rapper in the system regardless of the energy supplied during the control pulse to provide an alarm circuit. Current through each rapper plunger lift coil is sensed during at least a portion of the boost pulse. An alarm condition is signaled if this sensed current is outside of a predetermined range.

28 Claims, 11 Drawing Figures

ELECTROSTATIC PRECIPITATOR RAPPER CONTROL SYSTEM WITH ENHANCED ACCURACY

CROSS REFERENCE TO RELATED APPLICATION

Several aspects and features disclosed but not claimed herein are the subject matter of a commonly-assigned application Ser. No. 043,141, filed May 29, 1979, concurrently herewith, by William W. Andrews, and entitled "ELECTROSTATIC PRECIPITATOR RAPPER CONTROL SYSTEM RAPPER PLUNGER LIFT INDICATOR."

BACKGROUND OF THE INVENTION

The present invention relates generally to a control system for a plurality of rappers in an electrostatic precipitator. More particularly, the invention relates to such a system which controls a plurality of rappers in a desired sequence, which controls the rapping intensity of each individual rapper with enhanced accuracy, and which has provisions for indicating either an open circuited or a short circuited condition in any individual rapper or electrical connection thereto.

Electrostatic precipitators are widely employed, particularly among industrial users, for removing particulate from gases. A typical large electrostatic precipitator includes a housing in which banks of vertically-extending collecting electrode plates or curtains are disposed, with particulate-laden gas passing through the housing parallel to the the plates. The particulate carried by the gas stream is charged to one polarity by means of a corona discharge, and the collecting electrode plates are oppositely charged. The charged particles are therefore electrostatically attracted to the collecting electrodes.

In order to remove the collected particulate from the collection electrodes, rapping or vibrating devices are commonly employed. In a large precipator, there are a plurality of individually controlled rappers, each rapper vibrating an electrode group comprising one or more electrode plates. Collected particulate is dislodged by the vibration and falls by gravity to a sump or the like for removal. In such a system, to prevent noticeable reentrainment of collected particulate, it is desirable to operate only one rapper at a time. Further, it is known to be highly desirable to be able to control the rapping intensity of each individual rapper in the system. Various sections of a large precipitator tend to collect particulate at different rates. If rapping intensity higher than necessary for the actual level of particulate buildup in a particular section is employed, unnecessary stress is applied to the mechanical elements of the precipitator, leading potentially to premature failure.

A typical electromechanical rapper comprises a vertically movable plunger biased downwardly, for example by gravity, towards an impact and resting position. Preferably, the plunger rests upon an anvil rigidly connected to a group of collection electrode plates. For displacing the plunger, an electromagnetic coil is provided, which, when energized, lifts the plunger to a desired height. When the electromagnetic coil is subsequently de-energized, the plunger falls, striking the anvil and imparting vibration to the connected collection electrode plates. Rapping intensity accordingly depends upon the plunger displacement or lift before release. Plunger lift, and therefore rapping intensity, may generally be controlled by controlling the energy applied to the rapper coil.

One example of an electrostatic precipator rapper control system is disclosed in a commonly-assigned U.S. Pat. No. 3,504,480—Copcutt et al. The Copcutt et al control system generally addresses the concerns mentioned above. Power is sequentially fed to a plurality of rappers by a distribution switch. In order that the rappers may operate at different controlled intensities, power is supplied to the rappers through conduction-angle-controlled SCR's. In the Copcutt et al system, the intensity of each rapper is separately controlled.

SUMMARY OF THE INVENTION

It is a primary object of the present invention to provide a rapper control system which controls rapping intensity with enhanced accuracy.

It is still another object of the invention to provide such a system which controls a large number of rappers in any desired sequence, while providing rapping intensity control for each individual rapper.

It is still another object of the invention to provide an alarm circuit for a rapper control system, which alarm circuit reliably indicates both open circuited and short circuited conditions in the rapper coils or in the electrical connections to the rapper coils.

The present invention recognizes that one of the difficulties in achieving accurate control over rapping intensity relates generally to the unpredictable amount of plunger lift which results when an electrical pulse of a given energy is supplied. That is, even though lift pulses of identical energy are repetitively supplied to a given rapper coil, the amount of plunger lift or displacement may vary widely from one rap to the next. The invention more particularly recognizes that this unpredictable plunger lift or displacement is largely due to what are herein termed initial plunger sticking forces, which also are quite unpredictable. Initial plunger sticking forces comprise the combined effects of such phenomena as magnetic attraction of the plunger to the rapper rod or anvil, gravity and friction.

Briefly stated, and in accordance with one aspect of the invention, it has been discovered to be quite advantageous to apply a short boost pulse to a rapper coil immediately prior to a lift pulse of controlled energy. During the boost pulse, full lift energy is applied for a short period of time. This boost pulse reliably gets the the plunger moving, but displaces it only a relatively short distance. As an example of the lift distances involved, one particular type of rapper has a plunger weighing twenty pounds (9.1 kg), and a maximum lift or displacement of fourteen inches (35.6 cm). The initial boost pulse according to the invention raises such a plunger approximately one-half inch (1.3 cm), which provides a minimum rapping intensity.

With the initial plunger sticking forces overcome, the total plunger lift or displacement accurately reflects the electrical energy supplied during the subsequent lift pulse of controlled energy.

In accordance with another aspect of the invention, advantage may be taken of the relatively constant boost pulse which is supplied to every rapper in the system regardless of the energy supplied during the control pulse to provide an extremely accurate alarm circuit to signal either an open circuit condition, a short circuit condition, or both, in any rapper coil or electrical connections thereto. More particularly, there is provided a means for sensing the current through the electromagnetic rapper lift coil during at least portion of the boost pulse. In order to indicate a short circuit condition, there is provided a means for generating an alarm signal when the sensed current is above a predetermined level indicative of a short circuit condition. There may also be provided means for generating an alarm signal when the sensed current is below a predetermined level indicative of an open circuit condition. Since the boost pulse is substantially the same for every rapper in a system regardless of rapping intensity adjustment, the alarm limits may be adjusted once and be valid for all rappers in the system.

In accordance with still another aspect of the invention, a comprehensive multiple rapper control system includes a digital counter having a plurality of counter states representative of individual rappers. Connected to the output of the digital counter is a decoding means for enabling the individual rapper corresponding to each of the representative counter states. Additionally, a variable power control means is connected to supply the enabled rapper with a desired power level. A control logic means periodically increments the digital counter to enable successive rappers. The control logic additionally directs the power control means to first establish the boost pulse by supplying relatively high power to the enabled rapper for the predetermined duration, and to then establish the controlled energy pulse by supplying to the enabled rapper the proper amount of energy to further displace the plunger of the enabled rapper to the desired position which results in the desired rapping intensity. For versatility, the decoding means includes a programmable means such as a programmable read only memory (PROM) for altering the rapper sequence. As a result, the particular rapper corresponding to each representative counter state may readily be changed.

The present invention additionally contemplates the method of operating an electrostatic precipitator rapper to achieve accurate control of rapping intensity, which method comprises supplying the rapper coil with a first energization pulse of relatively high power level and of duration sufficient to overcome initial unpredictable rapper plunger sticking forces and to displace the rapper plunger from its resting position, and then immediately supplying the rapper coil with a second energization pulse having sufficient energy to further displace the rapper plunger to a desired position.

The invention further contemplates the method of providing an alarm which comprises the steps of sensing the current supplied to the rapper coil during at least a portion of the first energization pulse and signaling an alarm condition if the sensed current is outside of a predetermined range.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENT

Figure 1:
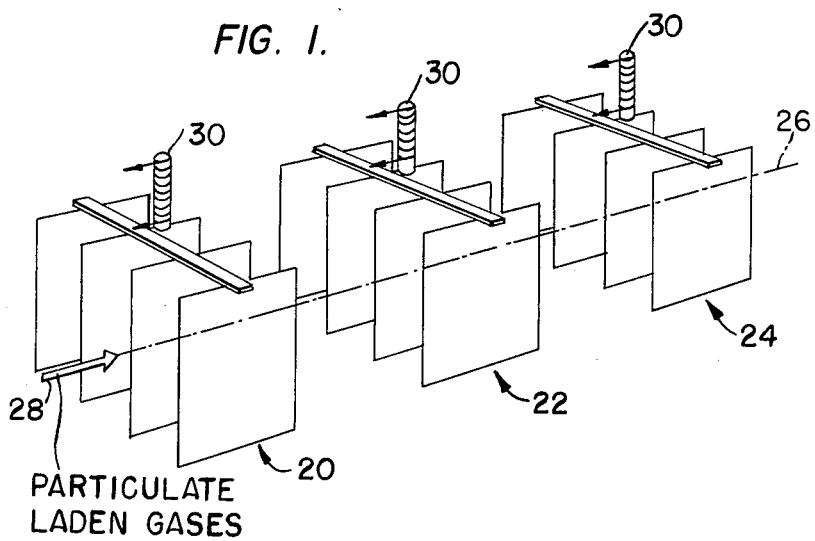
FIG. 1 is a highly schematic view of an electrostatic precipitator provided with a plurality of spaced collecting electrode banks along the flow path of particulate-laden gas fed thereto, each bank having an electromagnetic rapping means mechanically connected thereto.

Referring first to FIG. 1, collecting electrode banks 20, 22 and 24 are positioned within an electrostatic precipitator and spaced along the flow path or axis 26 of incoming particulate laden gases represented by an arrow 28. The collecting electrodes only in each bank are illustrated, the corona producing discharge electrodes not being shown. However, it will be understood that the discharge electrodes, as well as the collecting electrodes, may be rapped or vibrated.

In order to periodically rap or vibrate the collecting electrode banks 20, 22 and 24, a plurality of electromagnetic rappers 30 are provided. It will be understood that the number of collecting electrodes vibrated by each rapper, as well as the number of collecting electrodes in each bank, may vary depending upon the requirements of the particular installation.

Figure 2:
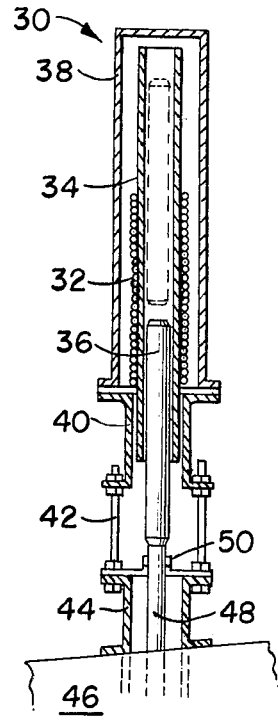
FIG. 2 is cross-sectional view of a single electromagnetic rapper shown mounted on an electrostatic precipitator.

In FIG. 2, a typical construction of one of the rappers 30 is illustrated. As more particularly seen in FIG. 2, the rapper 30 comprises an electromagnetic solenoid coil 32 supported on a tube 34. A rapper plunger 36 made of ferromagnetic material is disposed within the tube 34 so as to be upwardly displaced when the coil 32 is energized. The plunger 36 is biased by means of gravity towards its impact and resting position shown in solid lines, and is lifted towards the position denoted by broken lines when the coil 32 is energized.

For protection and to complete the magnetic circuit of the solenoid coil 32, a ferromagnetic cover 38 extends over the upper end of the tube 34 and solenoid coil 32 and is mounted upon a ferromagnetic base 40 having a lower portion provided with flanges through which pass portions of supporting bolts 42. A mounting bracket 44, similarily hollow and flanged, receives opposite end portions of the bolts 42 and is mounted on an electrostatic precipitator schematically designated 46. An anvil 48 is shown in the form of an enlongated rod whose upper end is surrounded and sealed by a flexible and apertured sealing element 50. The anvil rod 48 is suitably secured at its lower end to one or more electrodes of the banks 20, 22 and 24 in any one of a number of specific ways well known to those of ordinary skill in the art.

In the operation of the rapper 30, the magnetic field within the solenoid coil 32 causes the plunger 36 to rise to a desired height. When the energization pulse for the coil 32 is discontinued, the plunger 36 falls by gravity upon the top of the anvil rod 48, with the impulse thereof being transmitted to the electrodes to impart vibration thereto. The intensity of the rap depends upon the vertical displacement or lift of the plunger 36, which in turn depends generally upon the electrical energy supplied during the electrical lift pulse.

Figure 3:
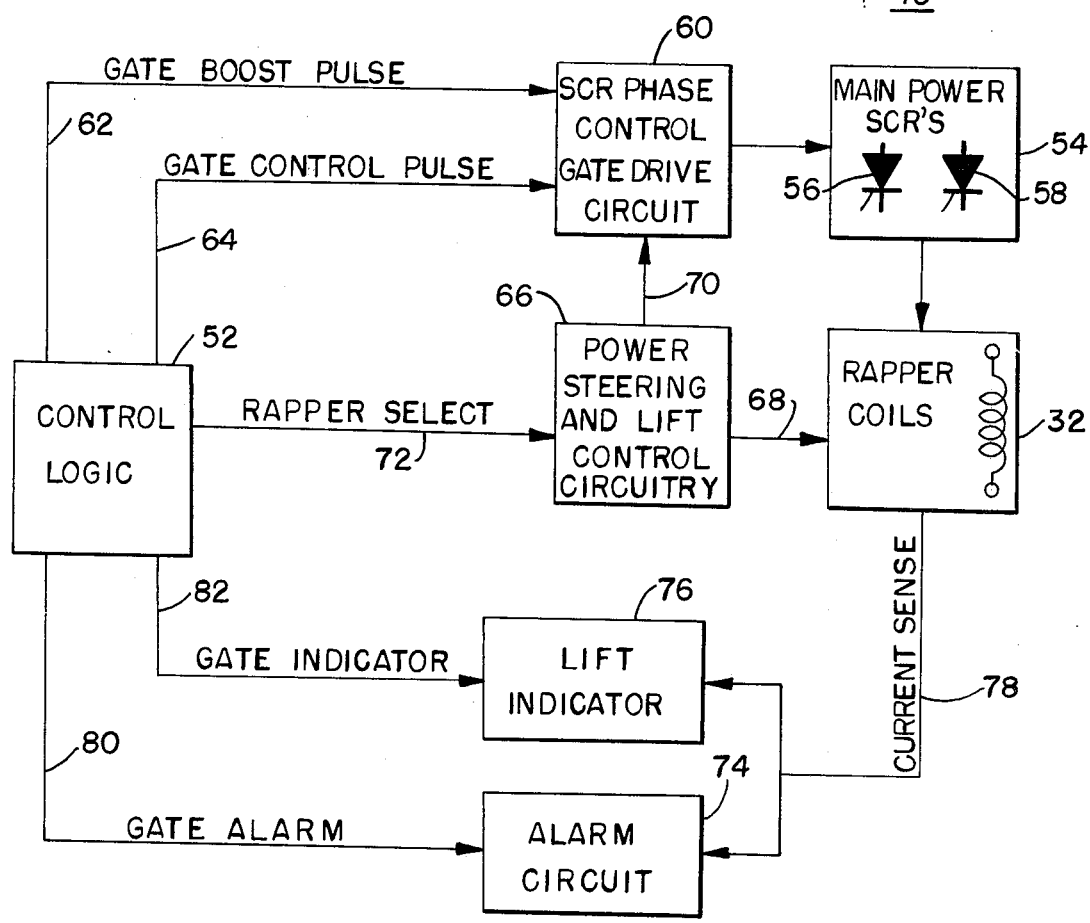
FIG. 3 is an overall block schematic diagram of a rapper control system embodying the present invention.

In FIG. 3, a rapper control system embodying the invention generally comprises control logic 52 which provides the timing for the entire system and which directs the operation of the remaining elements of the system. The rapper control system operates from a source of AC power and accordingly for convenience employs a pair 54 of main power SCR's 56 and 58 to energize the rapper coils 32. An SCR phase control gate drive circuit 60 gates the SCR's 56 and 58 at appropriate times to effect control over the energization of the rapper coils 32. In particular, the SCR's 56 and 58 may be gated ON for controlled numbers of AC current half cycles to effect so called "burst firing" or "zero crossing" power control, and additionally, may be initially switched ON at different moments within an AC current half cycle to effect "conduction angle" power control, also knows as "phase control."

In accordance with one aspect of the invention, the control logic 52 directs the SCR phase control gate drive circuit 60 to energize the rapper coils 32 in two distinct electrical current pulses. In FIG. 3, this dual pulse capability is designated by individual control lines 62 and 64 respectively denoted "Gate Boost Pulse" and "Gate Control Pulse". It will be appreciated that the separate lines 62 and 64 are intended to illustrate a general concept in accordance with the invention, and are not necessary reflected by actual electrical conductors in a particular implementation or embodiment.

Power steering and lift control circuitry 66 performs two general functions. The first function is enabling a particular one of the rapper coils 32 to be energized via the pair 54 of main power SCR's. The second function is supplying information to the SCR phase control gate drive circuit 60 concerning how much energy should be in the lift or control pulse for the particular enabled rapper. In the present control system, each of the rappers in the precipitator has an individual plunger lift or rapping intensity control. These two general control functions are represented by the lines 68 and 70, respectively. Again, it will be appreciated that the separate lines 68 and 70 are intended to illustrate general concepts, and are not necessarily reflected by actual conductors in a particular embodiment.

As represented by the "Rapper Select" line 72, the power steering and lift control circuitry 66 receives its commands from the control logic 52.

In the operation of the control system as thus far described, the control logic 52 selects a particular rapper for energization. The power steering and lift control circuitry 66 enables that particular rapper and additionally informs the SCR phase control gate drive circuit 60 concerning the particular rapper plunger displacement desired. In accordance with the invention, the rapper coil 32 is supplied with two distinct energization pulses.

First, by means of the representative "Gate Boost Pulse" control line 62, the control logic 52 directs the SCR phase control gate drive circuit 60 to gate the pair 54 of main power SCR's in a manner which supplies to the rapper coil a first energization pulse having a predetermined relatively high power level and a predetermined duration sufficient to overcome initial plunger sticking forces and to displace the rapper plunger from its resting position. Next, by means of the representative "Gate Control Pulse" control line 64, the control logic 52 directs the SCR phase control gate drive circuit 60 to gate the pair 54 of main power SCR's in a manner which supplies a second energization pulse having an energy level which causes further displacement of the rapper plunger to the desired position. During the second energization pulse, accurate rapping intensity control is provided.

The system of FIG. 3 additionally comprises an alarm circuit 74 and a lift indicator 76 which both include means for sensing the current supplied to the selected one of the rapper coils 32 during the current pulses supplied thereto. In FIG. 3, this current sensing capability is represented by a common "Current Sense" line 78. The alarm circuit 74 and lift indicator 76 receive their command or enabling signals from the control logic 52 through respective "Gate Alarm" and "Gate Indicator" lines 80 and 82. As previously noted, the alarm circuit 74 generally comprises an aspect of the present invention, while the lift indicator 76 generally comprises an aspect of the invention to which the commonly-asssigned copending Andrews application Ser. No. 043,141 is directed.

Briefly, the alarm circuit 74 is enabled during at least a portion of the boost pulse and examines the rapper coil current to determine whether it is within a predetermined range. If the current is too high, then a short circuit condition is indicated. If the current is too low, an open circuit condition is indicated. The alarm circuit 74 is advantageously employed in combination with the boost pulse concept of the present invention. The boost pulse is substantially the same for every rapper in the system, regardless of the energy supplied during the subsequent control pulse. Accordingly, fixed current thresholds may be used for the high and low current alarms, greatly simplifying the actual embodiments by eliminating any requirement for automatic readjustment of the alarm current thresholds as various rappers are selected.

Again briefly, the lift indicator 76 is enabled during the second energization pulse of controlled energy and functions to obtain an indication of plunger displacement by integrating current through the solenoid coil 32 with respect to time. By integrating current only during the control pulse and ignoring the boost pulse, a more accurate indication is achieved.

A specific embodiment will now be considered in detail with reference to FIGS. 4–11. Preliminarily, it should be noted that the circuitry illustrated and described herein operates from a suitable source of AC power (not shown) and includes conventional low voltage DC power supplies which also are not generally shown. Most of the circuitry is powered from a DC supply, represented by +V$_{CC}$ terminals, which provides +5 volts with reference to first circuit reference points 83, which may also be termed "circuit ground." For clarity, supply voltage connections to the various digital logic devices are for the most part omitted, as these will be understood to be conventional.

DETAILED DESCRIPTION OF CONTROL LOGIC 52

Figure 4:
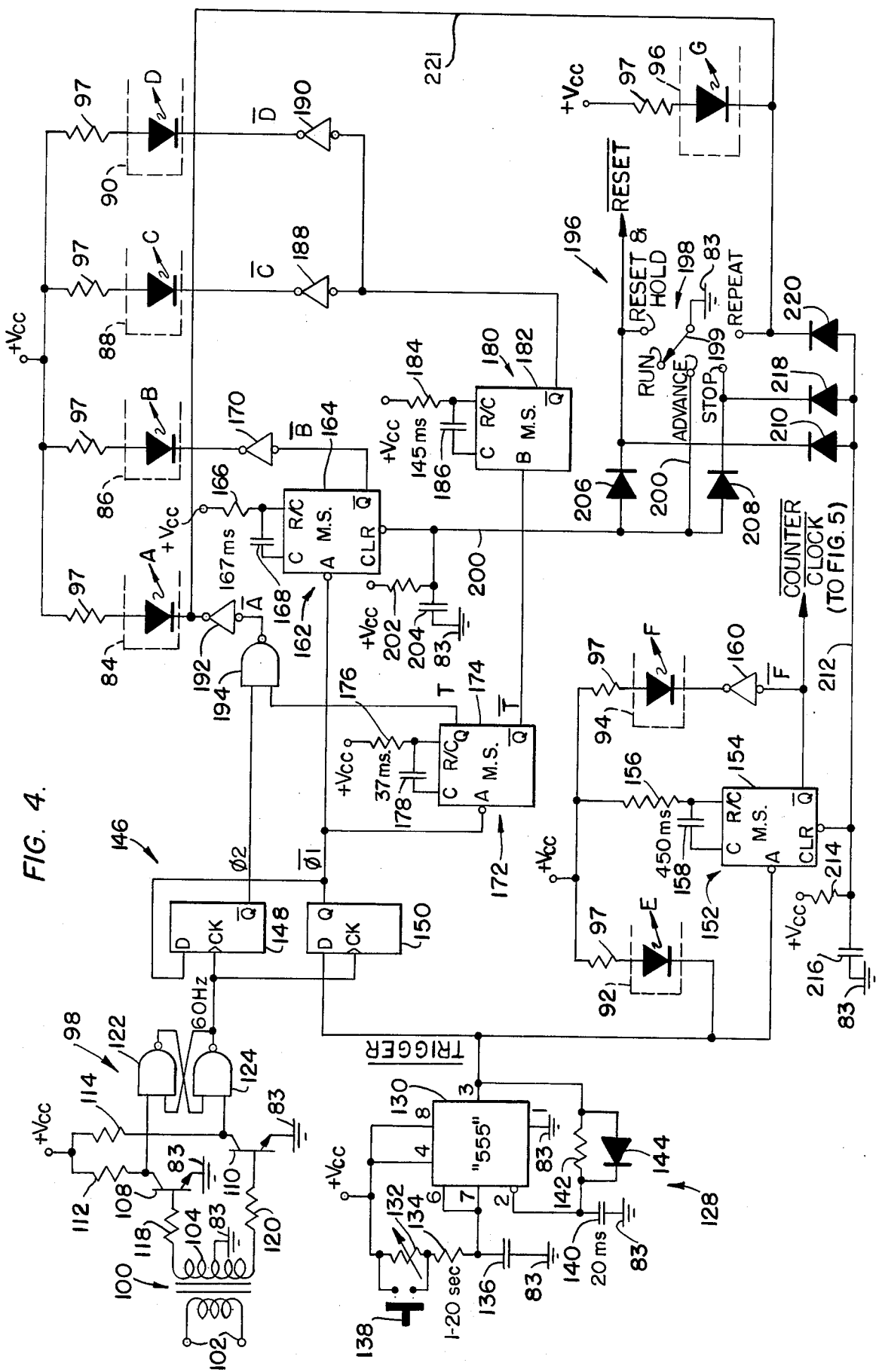
FIG. 4 is a detailed digital logic schematic diagram generally comprising the control logic of FIG. 3.

Referring now to FIG. 4, there is shown exemplary digital logic circuitry suitable for a portion of the control logic 52 of FIG. 3. The circuitry of FIG. 4 generally provides the sequencing the timing signals for other elements of the system. This circuitry supplies control signals to the other elements of the system by means of a plurality of optocouplers 84, 86, 88, 90, 92, 94 and 96, which may all be type No. TIL113, manufactured by Texas Instruments, Inc. Each of the optocouplers comprises an input gallium arsenide diode infrared source optically coupled to an output silicon NPN Darlington connected phototransistor. In FIG. 4, the infrared emitting diode portions only of the various optocouplers are illustrated, with the phototranisistor portions shown in various other drawing figures. For convenience of illustration, the Darlington connected phototransistors are shown as single phototransistors herein.

The infrared radiation signals emitted by the optocoupler diodes are designated by the letters A, B, C, D, E, F, and G, which may be seen from the drawing to correspond with respective individual optocouplers. The anodes of the optocoupler infrared emitting diodes are connected through individual current limiting resistors 97 to the $+V_{CC}$ source such that the optocouplers are activated when the diode cathodes are pulled low.

In order to achieve accurate power control during the initial boost pulse by ensuring that initial energization occurs over a complete AC half-cycle, the FIG. 4 control circuitry of is synchronized to the incoming AC line frequency by means of a 60 Hz square wave signal generated by a conditioning circuit 98. The conditioning circuit 98 comprises an isolation transformer 100 having its primary winding input terminals 102 connected to the source of AC power which supplies the system. A center-tapped secondary winding 10 has its center tap connected to the first circuit reference point 83. A pair of NPN switching transistors 108 and 110, connected in common emitter configuration, have their collectors connected through load resistors 112 and 114 to the $+V_{CC}$ power source terminal. The bases of the switching transistors 108 and 110 are supplied through current limiting resistors 118 and 120 from the opposite ends of the transformer secondary winding 104, which ends are 180° out of phase with respect to each other when referenced to the first circuit ground 83. To complete the conditioning circuit 98, the collectors of the switching transistors 108 and 110 are connected to the inputs of a Set-Reset flip-flop comprising cross-coupled NAND gates 122 and 124, with the output of the NAND gate 124 supplying the 60 Hz line.

In the operation of the conditioning circuit 98, the transistors 108 and 110 are alternately biased into conduction, generating alternate low and high logic signals which are supplied to the NAND gates 122 and 124. As the flip-flop is thereby toggled, a clean square wave signal is supplied on the 60 Hz line.

In order to periodically initiate or trigger the sequence of events which results in one of the rappers 30 being selected and energized, the circuit of FIG. 4 includes a timer 128 comprising an astable multivibrator built around a "555" integrated circuit (IC) timer 130. The timer 128 produces periodic logic low pulses on a $\overline{\text{TRIGGER}}$ line. The $\overline{\text{TRIGGER}}$ pulses are approximately twenty milliseconds in duration, and occur at intervals ranging from one to twenty seconds, as determined by a manually settable interval control.

In the particular timer circuit 128 illustrated, the output Pin 3 of the IC 130 is connected to supply the $\overline{\text{TRIGGER}}$ line. The ground Pin 1 is connected to the first circuit reference point 83, and the positive supply voltage Pin 8 is connected to the $+V_{CC}$ terminal. The reset Pin 4 is also connected to the $+V_{CC}$ terminal, as the reset function is not used in this particular circuit. The interval between $\overline{\text{TRIGGER}}$ pulses is determined by an RC timing circuit comprising series connected timing resistors 132 and 134, and a timing capacitor 136. The timing resistor 132 is a variable resistor, and comprises the above-mentioned manually settable interval control for the $\overline{\text{TRIGGER}}$ pulses. In order to provide a rapid advance function, the timing resistor 132 is bypassed by a normally open pushbutton switch 138. To sense the voltage on the timing capacitor 136, and more particularly to sense when the capacitor voltage has exceeded two-thirds of the $+V_{CC}$ supply voltage, the threshold Pin 6 is connected to the junction of the timing resistor 134 and the timing capacitor 136. To periodically discharge the capacitor 136 to begin intervals between $\overline{\text{TRIGGER}}$ pulses, the discharge Pin 7 is also connected to the junction of the timing resistor 134 and the timing capacitor 136. To establish the length of each $\overline{\text{TRIGGER}}$ pulse, the low activated trigger input Pin 2 is connected to another timing capacitor 140, which for discharging is connected through a timing resistor 142 to the output Pin 3 of the timer IC 130. In order to rapidly charge the timing capacitor 140 when the output Pin 3 is high, a bypass diode 144 is connected across the timing resistor 142.

As such timing circuits based on "555" timer IC's are well known, the operation of the timer 128 will be only briefly described. In between $\overline{\text{TRIGGER}}$ pulses, the output Pin 3 is high and the discharge Pin 7 is open circuited, allowing the timing capacitor 136 to charge through the timing resistors 132 and 134 towards the "$V_{CC}$ voltage. When the voltage on the timing capacitor 136 reaches two-thirds $+V_{CC}$, as sensed by the threshold Pin 6, the output Pin 3 goes low, and the discharge Pin 7 is internally shunted to the ground Pin 1, discharging the timing capacitor 136. With the output Pin 3 low, the timing capacitor 140 discharges through the timing resistor 142 with a 20 millisecond (ms) RC time constant. When the voltage on the timing capacitor 140 is less than one-third $+V_{CC}$, as sensed by trigger Pin 2, output Pin 3 again does high, terminating the $\overline{\text{TRIGGER}}$ pulse. Discharge Pin 7 also open circuits, allowing the timing capacitor 136 to again begin charging towards $+V_{CC}$.

The 60 Hz line and the $\overline{\text{TRIGGER}}$ line are both connected to a synchronization circuit 146 which does the actual synchronization of the circuit operation with the incoming AC wave form for the purpose of providing accurate control over the power supplied to the rapper coils 32. In particular, the synchronization circuit 146 comprises a pair of D type flip-flops 148 and 150 having their clock (CK) inputs connected to the 60 Hz square wave line. The $\overline{\text{TRIGGER}}$ line is connected to the D input of the lower flip-flop 150, and the Q output of the lower flip-flop 150 is connected to the D input of the upper flip-flop 148. The output of the synchronization circuit 146 is in the form of two clock phase signals $\phi 1$ and $\phi 2$, which are taken respectively from the Q output of the lower flip-flop 150 and the $\overline{Q}$ output of the upper flip-flop 148.

The TRIGGER line is also connected to the cathode of the infrared emitting diode of the optocoupler 92 which supplies an optical signal E to the lift indicator circuit 76 described below in detail with reference to FIG. 8. Additionally, the TRIGGER line is connected to the low activated "A" input of a 450 millisecond (ms) one shot 152 comprising a monostable (M.S.) multivibrator integrated circuit 154, which may be one-half of a Texas Instruments Type No. SN74221 TTL integrated circuit. To establish the duration of the output pulse from the one shot 152, a timing resistor 154 and timing capacitor 158 are appropriately connected to the R/C and C inputs of the integrated circuit 154, with the free end of the timing resistor 156 connected to the $+V_{CC}$ terminal.

In the operation of the one shot 152, a transition from logic high to logic low on the A input triggers an output pulse having a duration determined by the 450 ms RC time constant. In this particular circuit, to produce an active low output pulse, the $\overline{Q}$ output of the integrated circuit 154 is used and supplies a line designated both $\overline{F}$ and $\overline{COUNTER\ CLOCK}$.

To enable the power circuitry described in detail below with particular reference to FIG. 6 during the output pulse from the one shot 152, the $\overline{F}$ line is connected through a buffer amplifier 160 to the anode of the infrared emitting diode of the optocoupler 94, which diode emits the F infrared signal. The $\overline{COUNTER\ CLOCK}$ line is connected to the digital counter described below with particular reference to FIG. 5.

To provide a power pulse signal during the entire period of energization of the selected rapper coil, the $\overline{\phi 1}$ clock phase line is connected to the low activated "A" input of a 167 ms one shot 162 which also comprises one-half of a Texas Instruments Type No. SN74221 dual monostable multivibrator integrated circuit 164. A timing resistor 166 and timing capacitor 168 are suitably connected to establish the 167 ms output pulse duration. The $\overline{Q}$ output of the integrated circuit 164 is connected to an active low $\overline{B}$ line which supplies the anode of the infrared emitting diode of the optocoupler 86 through a buffer amplifier 170.

In order to delay the start of the second energization pulse or control pulse and thus permit a full power first energization pulse or boost pulse to occur, a 37 ms one shot 172 is provided, also comprising one-half of a Type No. SN74221 dual monostable multivibrator integrated circuit 174. A timing resistor 176 and timing capacitor 178 establish the 37 ms output pulse duration. The $\overline{\phi 1}$ clock pulse line is connected to the low activated "A" input of the integrated circuit 174, thus triggering the 37 ms one shot 172 simultaneously with the triggering of the 167 ms one shot 162.

The $\overline{Q}$ output of the integrated circuit 174 supplies a $\overline{T}$ line which is connected to trigger a 145 ms one shot 180. The one shot 180 also comprises one-half of a Type No. SN74221 integrated circuit 182, and has a timing resistor 184 and timing capacitor 186 appropriately connected to establish the 145 ms output pulse duration. Since it is desired to trigger the 145 ms one shot 180 on the trailing edge of the pulse from the 37 ms one shot 172, the $\overline{T}$ line is connected to the high activated "B" input of the integrated circuit 182.

The Q output of the integrated circuit 182 supplies C and D lines through buffer amplifiers 188 and 190, respectively. The outputs of the buffer amplifiers 188 and 190 are connected to the anodes of the infrared emitting diodes of the optocouplers 88 and 90, which diodes simultaneously generate the C and D infrared signals during the output pulse from the 145 ms of one shot 180.

The last of the primary control signals from the circuitry of FIG. 4 is supplied through the optocoupler 84 which generates the A infrared signals. The anode of the infrared emitting diode of this optocoupler 84 is supplied through a buffer amplifier 192 from the output of a NAND gate 194, which in turn receives its inputs from the $\phi 2$ clock phase line and, via a T line, from the Q output of the monostable multivibrator IC 174 comprising the 37 ms one shot 172. Accordingly, the optocoupler 84 is active when the clock phase signal $\phi 2$ and the output pulse from the 37 ms one shot 172 are simultaneously present.

For operator control over the operation of the rapper control system, mode switch circuitry 196 is provided. The mode switch circuitry 196 comprises a five position rotary switch 198 having the common end of the movable contact 199 connected to the first circuit reference point 83.

When the movable switch contact 199 is in the "Run" position illustrated, the various elements of FIG. 4 are free to operate in their normal manners. In order to disable the energization of all rappers when the mode switch 198 is in the "Advance" position, a line 200 connects the advance terminal of the switch 198 to the low active clear (CLR) input of the IC 164 comprising the 167 millisecond one shot 162. A pull-up resistor 202 is connected between the line 200 and the $+V_{CC}$ terminal, and a transient suppression capacitor 204 is connected between the line 200 and the first circuit reference point 83. To prevent other mode functions from occurring when the "Advance" mode is selected, steering diodes 206 and 208 are provided to isolate the low active signal on the line 200.

Figure 5:
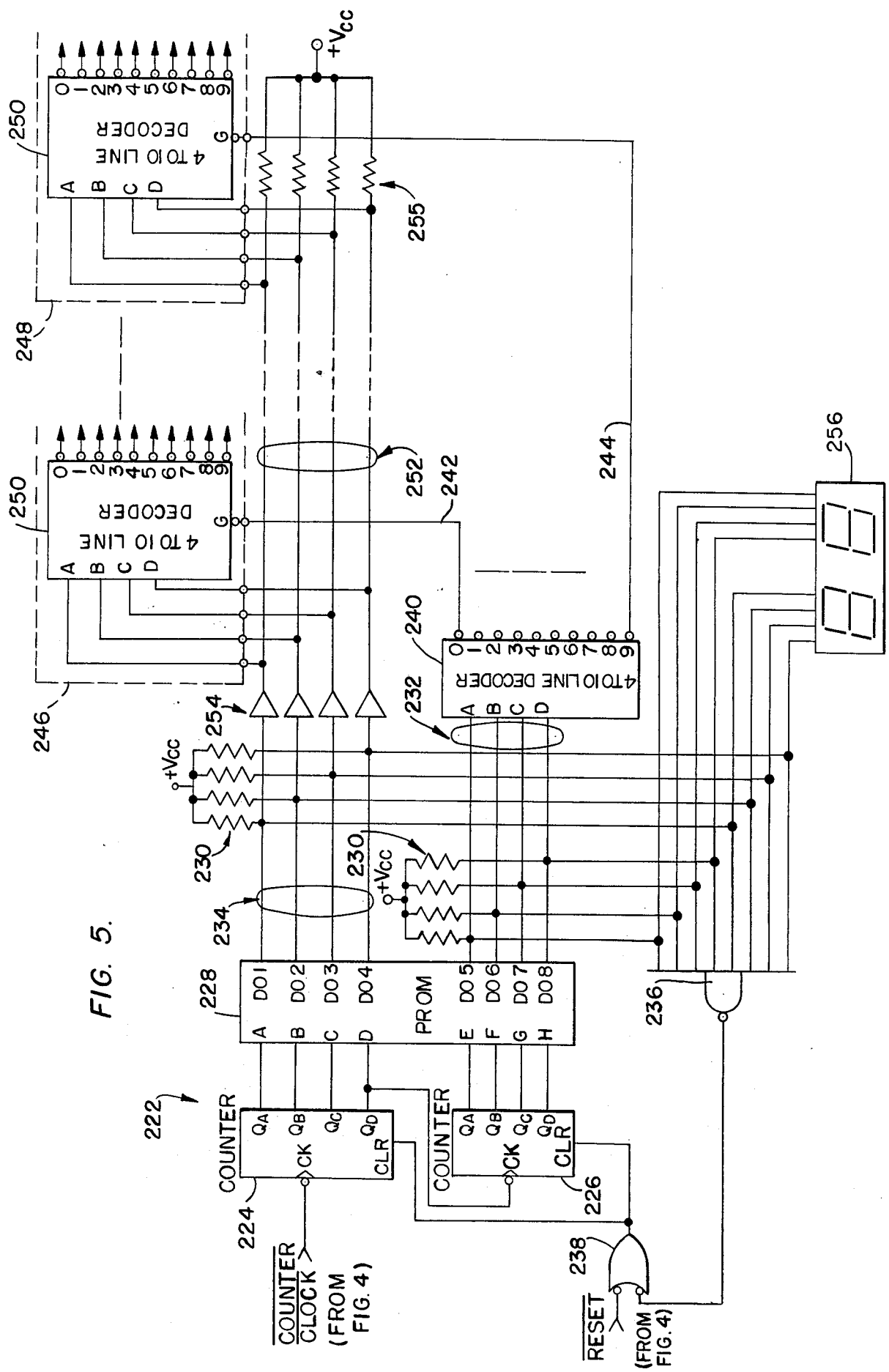
FIG. 5 is a logic schematic diagram of a further portion of the control logic of FIG. 3, and particularly the portion thereof which selects a particular rapper for energization according to a programmed sequence.

The "Reset & Hold" terminal of the mode switch 198 is connected to a $\overline{RESET}$ line which supplies the counter circuitry of FIG. 5. This terminal is additionally connected through the steering diode 206 to the CLR input of the 167 ms one shot 162, and through a steering diode 210 and a line 212 to the CLR input of the 450 ms one shot 152. The line 212 also has a pull-up resistor 214 tied to the $+V_{CC}$ terminal, and a transient suppression capacitor 216 connected to the first circuit reference point 83.

The "Stop" terminal of the mode switch 198 is connected through the steering diode 208 and the line 200 to the CLR input of the 167 ms one shot 162, and through a steering diode 218 and the line 212 to the CLR input of the 450 ms one shot 152.

Figure 10:
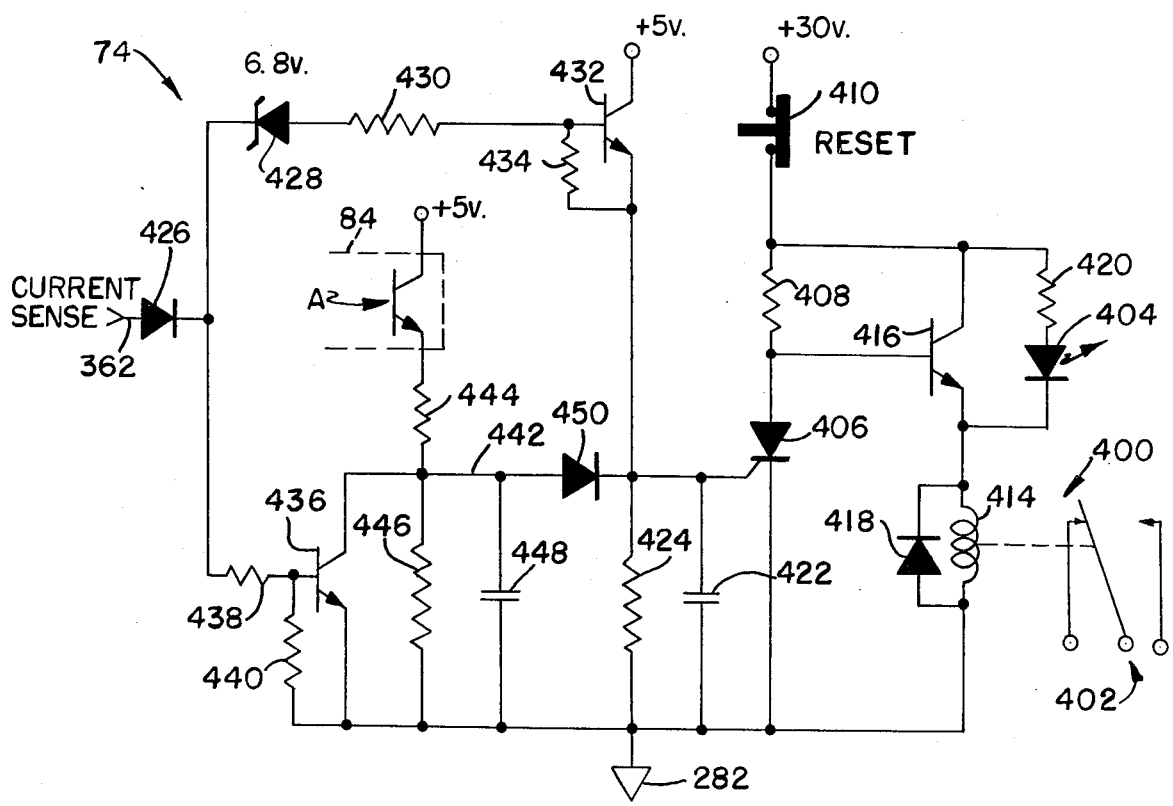
FIG. 10 is an electrical schematic diagram of the "alarm circuit" of FIG. 3.

Lastly, the "Repeat" terminal of the mode switch 198 is connected through a steering diode 220 and the conductor 212 to the CLR input of the 450 ms one shot 150. The "Repeat" terminal is also connected to the anode of the infrared emitting diode of the optocoupler 96, the photo-transistor of which may be seen in FIG. 6 to be connected in parallel with the phototransistor of the optocoupler 94 which conveys the F infrared signal. To minimize the possibility of the mode switch 198 being inadvertently left in the "Repeat" position, the "Repeat" terminal is also connected through a line 221 to the anode of the infrared emitting diode of the optocoupler 96, the phototransistor of which is shown in FIG. 10. This causes the alarm circuit to be maintained in an "Alarm" state, as will be more apparent from the description below with reference to FIG. 10.

RAPPER SELECT CIRCUITRY

Referring now to FIG. 5, there is illustrated a portion of the control logic 52 which selects a particular one of the rappers 30 for energization. The rapper select circuitry of FIG. 5 comprises a digital counter 222 which is constructed from a pair of series connected four bit integrated circuit counters 224 and 226 which may both be included within a single Texas Instruments Type No. SN74393 TTL dual four bit binary counter. The COUNTER CLOCK line from the $\bar{Q}$ output of the 450 ms one shot 152 of FIG. 4 is connected to the clock (CK) input of the first counter IC 224, and the $Q_D$ output of the first counter IC 224 is connected to the clock (CK) input of the second IC counter 226. It will be appreciated that the digital counter 222 has a plurality of states representative of individual rappers.

In order to provide maximum versatility in programming the present rapper control circuit, the eight counter output lines are connected to the address inputs A, B, C, D, E, F, G and H of a programmable read only memory (PROM) 228, which may be a Texas Instruments Type No. SN74470 TTL programmable read only memory integrated circuit with open collector outputs. Pull-up resistors 230 are connected between the PROM data output lines D01, D02, D03, D04, D05, D06, D07 and D08 and the $+V_{CC}$ terminal.

The data outputs from the PROM 228 are divided into two groups. A lower group 232 comprises the data output lines D05, D06, D07 and D08 which carry a binary code indicating which one ten banks of the rappers 30 is selected. An upper group 234 comprises the data output lines D01, D02, D03 and D04 which carry a binary code indicating which particular one of up to ten rappers in the selected rapper bank is selected.

It will be appreciated that by means of appropriate programming of the PROM 228, the various rappers in the system may be energized in any desired sequence. Further, the sequence may be easily changed at any time without requiring any wiring change. Moreover, although the present exemplary embodiment is herein described in terms of a system capable of controlling up to one hundred individual rappers, any lesser number may be controlled. Thus the basic system is adaptable to many different electrostatic precipitators. An additional advantage accruing as a result of the PROM 228 is that it facilitates system design for easy modular expansion one bank of ten rappers at a time. Selection of a particular rapper bank and of a particular rapper in the bank may be straightforwardly accomplished by programming.

By way of example only, and not by way of limitation, the following TABLE I shows a typical programming of the PROM 228 for a system controlling twelve rappers in a sequence including a total of twenty-eight blows or raps. In this particular program, some rappers are operated more frequently than others. For example, Rapper No. 1 is operated four times during each cycle, while Rapper No. 9 is operated only once. Fully expanded, the present system is capable of delivering two hundred fifty-five blows to one hundred rappers in any desired sequence, before repeating the sequence.

TABLE I

| Count No. | Address Inputs | | | | | | | | Data Outputs | | | | | | | | Rapper Bank No. | Rapper No. |
| --- | --- | --- | --- | --- | --- | --- | --- | --- | --- | --- | --- | --- | --- | --- | --- | --- | --- | --- |
| | H | G | F | E | D | C | B | A | D08 | D07 | D06 | D05 | D04 | D03 | D02 | D01 | | |
| 0 | L | L | L | L | L | L | L | L | L | L | L | L | L | L | L | H | 0 | 1 |
| 1 | L | L | L | L | L | L | L | H | L | L | L | L | L | L | H | L | 0 | 2 |
| 2 | L | L | L | L | L | L | H | L | L | L | L | L | L | L | H | H | 0 | 3 |
| 3 | L | L | L | L | L | L | H | H | L | L | L | L | L | H | L | L | 0 | 4 |
| 4 | L | L | L | L | L | H | L | L | L | L | L | L | L | H | L | H | 0 | 5 |
| 5 | L | L | L | L | L | H | L | H | L | L | L | L | L | H | H | L | 0 | 6 |
| 6 | L | L | L | L | L | H | H | L | L | L | L | L | L | H | H | H | 0 | 7 |
| 7 | L | L | L | L | L | H | H | H | L | L. | L | L | H | L | L | L | 0 | 8 |
| 8 | L | L | L | L | H | L | L | L | L | L | L | L | L | L | L | H | 0 | 1 |
| 9 | L | L | L | L | H | L | L | H | L | L | L | L | L | L | H | L | 0 | 2 |
| 10 | L | L | L | L | H | L | H | L | L | L | L | L | L | L | H | H | 0 | 3 |
| 11 | L | L | L | L | H | L | H | H | L | L | L | L | L | H | L | L | 0 | 4 |
| 12 | L | L | L | L | H | H | L | L | L | L | L | L | H | L | L | H | 0 | 9 |
| 13 | L | L | L | L | H | H | L | H | L | L | L | H | L | L | L | L | 1 | 0 |
| 14 | L | L | L | L | H | H | H | L | L | L | L | H | L | L | L | H | 1 | 1 |
| 15 | L | L | L | L | H | H | H | H | L | L | L | H | L | L | H | L | 1 | 2 |
| 16 | L | L | L | H | L | L | L | L | L | L | L | L | L | L | L | H | 0 | 1 |
| 17 | L | L | L | H | L | L | L | H | L | L | L | L | L | L | H | L | 0 | 2 |
| 18 | L | L | L | H | L | L | H | L | L | L | L | L | L | L | H | H | 0 | 3 |
| 19 | L | L | L | H | L | L | H | H | L | L | L | L | L | H | L | L | 0 | 4 |
| 20 | L | L | L | H | L | H | L | L | L | L | L | L | L | H | L | H | 0 | 5 |
| 21 | L | L | L | H | L | H | L | H | L | L | L | L | L | H | H | L | 0 | 6 |
| 22 | L | L | L | H | L | H | H | L | L | L | L | L | L | H | H | H | 0 | 7 |
| 23 | L | L | L | H | L | H | H | H | L | L | L | L | H | L | L | L | 0 | 8 |
| 24 | L | L | L | H | H | L | L | L | L | L | L | L | L | L | L | H | 0 | 1 |
| 25 | L | L | L | H | H | L | L | H | L | L | L | L | L | H | L | L | 0 | 2 |
| 26 | L | L | L | H | H | L | H | L | L | L | L | L | L | L | H | H | 0 | 3 |
| 27 | L | L | L | H | H | L | H | H | L | L | L | L | L | H | L | L | 0 | 4 |
| 28 | L | L | L | H | H | H | L | L | H | H | H | H | H | H | H | H | (RESET) | |

In the above TABLE I, it can be seen that while the address input states occur in a normal binary counting sequence as the digital counter 222 proceeds through its count, the states on the data outputs occur in accordance with the programmed sequence. It can further be seen that the four data outputs D08, D07, D06 and D05 carry binary numbers representing which one of the ten possible rapper banks is selected, and the four data outputs D04, D03, D02 and D01 carry binary numbers representing which one of the ten rappers in the selected bank is selected. Accordingly, the PROM 228, along with the circuitry described hereinafter connected to the outputs thereof, serves as a decoding means for enabling whichever one of the individual rappers corresponds to a particular state of the digital counter 222.

In order to reset the digital counter 222 to the beginning of the counting sequence when the last of the rappers 30 in the system has been energized, an eight-input NAND gate 236 has its inputs connected to the eight data output (DO) lines of the PROM 228. As may be seen from the above TABLE I, the programming of the PROM 228 is such that following the selection of the last rapper, upon the reaching of the next state of the digital counter 222 all of the data output (DO) lines go high, activating the NAND gate 236. The condition of all the data output lines being high is not recognized by the circuitry which follows as a valid rapper selection, so no rapper is energized during reset.

To complete the reset circuitry, the output of the NAND gate 236 is connected to an input of a low activated OR gate 238, which has its output connected to the clear (CLR) inputs of both of the IC counters 224 and 226.

For manual reset, the other input of the low activated OR gate 238 is connected to the $\overline{\text{RESET}}$ line from the mode switch 198 of FIG. 4.

For the selection of a particular one of the groups of rappers, the lower group 232 of data output lines is connected to the four inputs A, B, C and D, of a four-to-ten line decoder 240, which may comprise a Texas Instruments Type No. SN7442 TTL integrated circuit. Although up to ten output lines may be connected to the four-to-ten line decoder 240, only the first line 242 and the last line 244 are shown. The lines 242 and 244 are connected to the inputs of two separate SCR boards 246 and 248, with the input portions only of the boards 246 and 248 shown in FIG. 5. The boards 246 and 248 preferably comprise plug-in boards, and any number from one to ten may be used in the system, depending upon the requirements of the particular installation. Each board corresponds to a bank of up to ten rappers.

Each of the SCR boards 246 and 248 comprises a four-to-ten line decoder 250, which may be a Texas Instruments Type No. SN74154 four-to-sixteen line decoder, with only the first ten outputs being used. For actual selection of a particular SCR board and thus of a bank of rappers, the low activated strobe inputs (G) of the decoders 250 are connected to the select lines 242 and 244.

The upper group 234 of data output (DO) lines from the PROM 228 drives a four line data bus 252 through a set of four buffer amplifiers 254 having output pull up resistors 255. The SCR boards 246 and 248, representing as many as may actually be desired, are plugged in to the data bus 252, with the inputs to the decoders 250 connected to the four lines of the data bus 252.

For system monitoring and diagnostic purposes, conventional decoder and digital display circuitry 256 is connected to the PROM 228 data output lines. The circuitry 256 indicates, by bank and rapper, which one of the system rappers is selected or enabled at any time. This is particularly useful in connection with the alarm indicator described below with reference to FIG. 10. By way of example, the circuitry 256 may comprise a pair of Texas Instruments Type No. SN7447 BCD-to-seven-segment decoders/drivers connected to drive a pair of Type No. TIL312 seven-segment displays.

DETAILED DESCRIPTION OF POWER STEERING AND LIFT CONTROL CIRCUITRY 66

Figure 6:
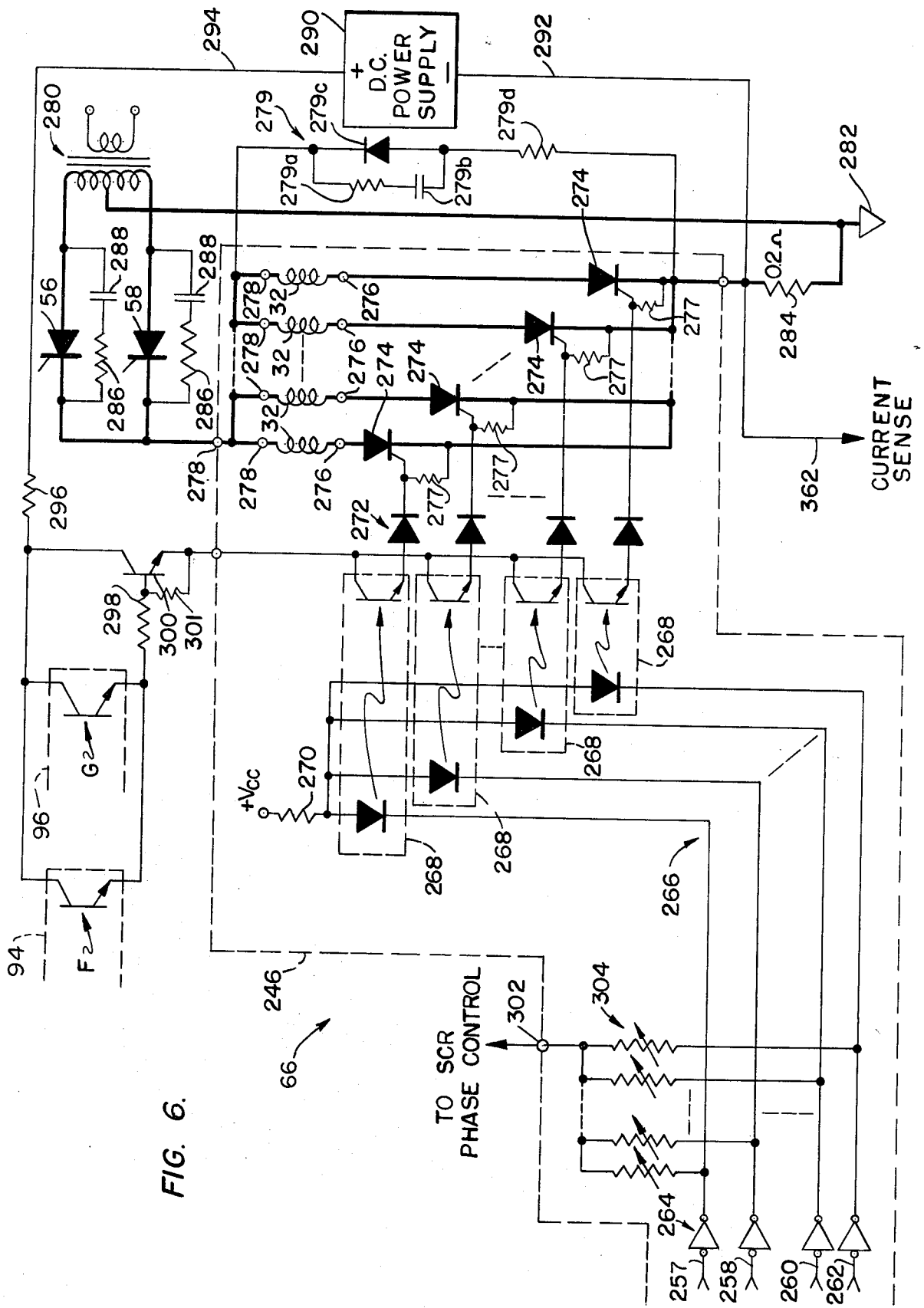
FIG. 6 is an electrical schematic diagram generally comprising the "power steering and lift control circuitry", the "main power SCR's", and the "rapper coils" of FIG. 3.

In FIG. 6 there is shown in dash lines the remainder of representative SCR board 246, which generally comprises the power steering the lift control circuitry 66 of FIG. 3. It will be appreciated that the remaining SCR boards, including the SCR board 248 only partially shown in FIG. 5, are identical.

The input portion of the SCR board 246 has ten lines extending from the outputs of the decoder 260 of FIG. 5, but in FIG. 6 only the first, second, ninth and tenth are shown. These lines are respectively designated 257, 258, 260 and 262, and each is connected through one of the buffer amplifiers of a set 264 to one of a set of rapper select lines 266.

The representative SCR board 246 also has a set of up to ten optocouplers 268, each of the optocouplers 268 as well as each one of the buffer amplifiers 264 being dedicated to a single one of the system rappers 30. The anodes of all of the optocoupler infrared emitting diodes of the optocouplers are connected through a single current limiting resistor 270 to the $+V_{CC}$ terminal, since they are activated only one at a time. The cathodes of these infrared emitting diodes are connected to the rapper select lines 266 so as to be activated when the lines 266 go low.

The output phototransistors of the optocouplers 268 have their emitters connected through isolation diodes 272 to the gates of power steering SCR's 274. Each of the power steering SCR's 274 is dedicated to a single one of the rapper coils 32, with the anodes of each of the power steering SCR's 274 connected to one terminal of its respective one of the rapper coils 32 through connections represented by terminals 276. Biasing resistors 277 are connected between the gates and cathodes of the SCR's 274. To complete the connection to the rapper coils 32, the other rapper coil terminals are all connected together through representative connections 278. Lastly, a free-wheeling diode and SCR commutation network 279 comprising elements 279a through 279d is connected accross the steering SCR and rapper coil circuit.

The two main power SCR's 56 and 58 described above with reference to FIG. 3 are more particularly shown in FIG. 6. These two main power SCR's 56 and 58 serve the entire system and are effectively connected to whichever of the rappers 30 is enabled by means of the power steering circuitry, which circuitry includes the power steering SCR's 274.

Power circuitry is shown in heavy lines in FIG. 6 and comprises a power transformer 280 having its primary winding connected to a suitable AC source such as a 240 volt or 480 volt 60 Hz line. The secondary winding of the power transformer 280 has a center tap connected to a second common circuit reference point 282, as well as through a 0.2 Ohm current sensing resistor 284 to the cathodes of each of the power steering SCR's 274.

The secondary winding terminals of the power transformer 280 are connected through the main power SCR's 56 and 58 to the common terminals 278 of the rapper coils 32. Each of the main power SCR's 56 and 58 has a protective network comprising a series connected resistor 286 and a capacitor 288 connected across its anode and cathode terminals.

A DC power supply 290, supplying approximately twenty volts, provides gate drive current for the power steering SCR's 274. The negative (−) terminal of the power supply 290 is connected through a line 292 to the cathodes of each of the power steering SCR's. The positive (+) terminal is connected through a line 294 and through a current limiting resistor 296 to the collectors of the phototransistors comprising the optocouplers 94 and 96 which convey the infrared signals F and G from the control circuitry of FIG. 4. The emitters of these phototransistors are connected through a current limiting resistor 298 to the base of a switching transistor 300 connected in emitter follower configuration and supplying the collectors of the phototransistors comprising the output elements of the optocouplers 268. A biasing resistor 301 is connected between the base and emitter of the transistor 300.

Figure 7:
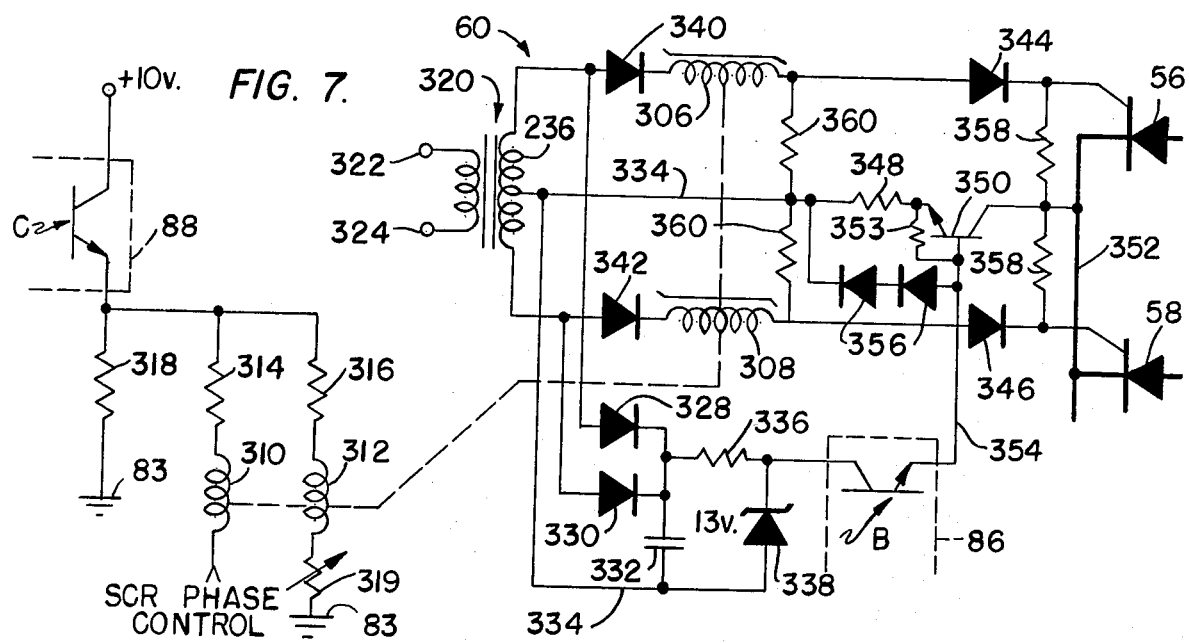
FIG. 7 is an electrical schematic diagram of the "SCR phase control gate drive circuit" of FIG. 3.

The portion of the SCR board 246 illustrated in FIG. 6 also has an output through a terminal 302 to the SCR phase control gate drive circuit 60, shown in detail in FIG. 7. This output, which takes the form of a resistance value to ground, indicates to the SCR phase control gate drive circuit 60 the particular energy level which is to be supplied to the selected rapper coil during the second or control pulse. The FIG. 6 circuit comprises individual rapping intensity selecting variable resistors 304 which have their upper terminals connected together and to the terminal 302, and their lower terminals connected to the rapper select lines 266. Each of the rappers 30 in the system has an individual intensity selecting variable resistor 304. In operation, the lower end of the variable resistor 304 corresponding to the selected rapper is pulled low by the appropriate one of the rapper select lines 266.

DETAILED DESCRIPTION OF SCR PHASE CONTROL GATE DRIVE CIRCUIT 60

Referring now to FIG. 7, there is illustrated the SCR phase control gate drive circuit 60 which provides gating signals to the main power SCR's 56 and 58 in accordance with several control signals. The first of these control signals is transmitted via the infrared signal B through the optocoupler 86, the infrared emitting diode portion of which is shown in FIG. 4. When the optocoupler 86 is active, the SCR's 56 and 58 may be gated. This input controls the overall duration of an energization burst which comprises a plurality of AC half-cycles. Another input is transmitted via infrared signal C through the optocoupler 88 which enables the power control circuitry. It specifically enables a reduction in power during the second energization pulse or control pulse. The last input is the "SCR Phase Control" line from the terminal 302 of FIG. 6, which is effectively connected, through whichever one of the variable resistors 304 which has its lower end connected to logic low through a corresponding one of the buffer amplifiers 264, to the first circuit ground 83. This last input controls the conduction angle of the SCR's 56 and 58 when conduction angle control is enabled by the infrared signal C.

For convenience, the circuit of FIG. 7 employs a conventional saturable reactor SCR phase control. The saturable reactor control has a pair of main windings 306 and 308, and a pair of control windings 310 and 312. The characteristics of the saturable reactor SCR control is such that when current is not flowing through the control windings 310 and 312, the main power SCR's 56 and 58 are gated for maximum conduction angle and thereby supply full power. As increasing current flows through the control windings 310 and 312, the conduction angle of the SCR's 56 and 58 is reduced.

In particular, the control winding portion of the FIG. 7 circuit comprises the phototransistor of the opto-coupler 88, which phototransistor has its collector connected directly to a +10 volt DC source, and its emitter connected to the control windings 310 and 312. Specifically, the emitter is connected to the control windings 310 and 312 through resistors 314 and 316, as well as being connected through a resistor 318 to the first circuit reference point 83. The lower end of the control winding 310 is connected to the SCR phase control line 302 from FIG. 6, and the lower end of the control winding 312 is connected through a variable resistor 319 to the first circuit reference point. The variable resistor 319 serves as a master lift control affecting all of the rappers in the system by means of the control winding 312. The individual variable resistors 304 (FIG. 6) effect control over individual rapper lifts by means of the control winding 310.

In the main winding portion of the saturable reactor control circuit of FIG. 7, a control voltage transformer 320 has its primary winding connected through terminals 322 and 324 to the same source of AC power which supplies the rest of the system. The power transformer secondary winding 326 is connected to two separate power supply sections. In general, the first power supply section operates those elements of the SCR phase control gate drive circuit 60 which control power by the "burst firing" method in which SCR conduction occurs for a controlled plurality of AC half-cycles. The second power supply section in general operates those elements of the SCR gate drive circuit 60 which control power by the "conduction angle" method in which SCR conduction occurs for the controlled fractions, expressed in degrees, of AC half-cycles.

More specifically, the first power supply section is a conventional filtered and regulated DC power supply comprising rectifier diodes 328 and 330 having their anodes connected to the secondary winding terminals, and having their cathodes connected to a filter capacitor 332, which has its other end connected to a negative reference line 334 connected to the center tap of the secondary winding 326. A current limiting resistor 336 and a 13 volt Zener diode 338 complete the first power supply section.

The second power supply section comprises two rectified but unfiltered half-wave supplies, 180° out of phase, which feed the phase control saturable reactor main windings 306 and 308. Specifically, a pair of rectifier diodes 340 and 342 are connected between the outer terminals of the secondary winding 326 and the left hand terminals of the saturable reactor main windings 306 and 308. The right hand terminals of the main windings 306 and 308 are connected through diodes 344 and 346 to the gate terminals of the main power SCR's 56 and 58.

In order to control the overall duration of SCR gating for "burst firing" control, the negative reference line 334 is interrupted by a current limiting resistor 348 and the emitter/collector circuit of a switching transistor 350. The collector of the transistor 350 is connected to the common cathode line 352 of the SCR's 56 and 58. A biasing resistor 353 is connected between the base and emitter of the transistor 350. The base of the transistor 350 is connected via a line 354 through the emitter/collector circuit of the output phototransistor of the optocoupler 86 to the positive voltage produced by the first power supply section.

To complete the gate drive circuitry, a pair of voltage clamping protective diodes 356 are connected in series between the base of the transistor 350 and the negative reference line 334, resistors 358 are connected between the main power SCR gates and the common anode line 352, and resistors 360 are connected between the saturable reactor main winding right hand terminals and the negative reference line 334.

RAPPER COIL CURRENT SENSING

In FIG. 6, the current sensing resistor 284 is interposed in the power circuit (shown in heavy lines) in series with the selected one of the power steering SCR's 274, the selected one of the rapper coils 32, and the main power SCR's 56 and 58. Accordingly, the voltage drop across the current sensing resistor 284 represents rapper coil current and is supplied through a "Current Sense" line 362 to the Lift Indicator 76 circuitry shown in detail in FIG. 8 and to the Alarm Circuitry 74 shown in detail in FIG. 10. The circuits of FIGS. 8 and 10 therefore each include means for sensing the current through the selected one of the rapper coils 32. Each of these circuits is referenced to the second common circuit reference point 282.

LIFT INDICATOR 76

Figure 8:
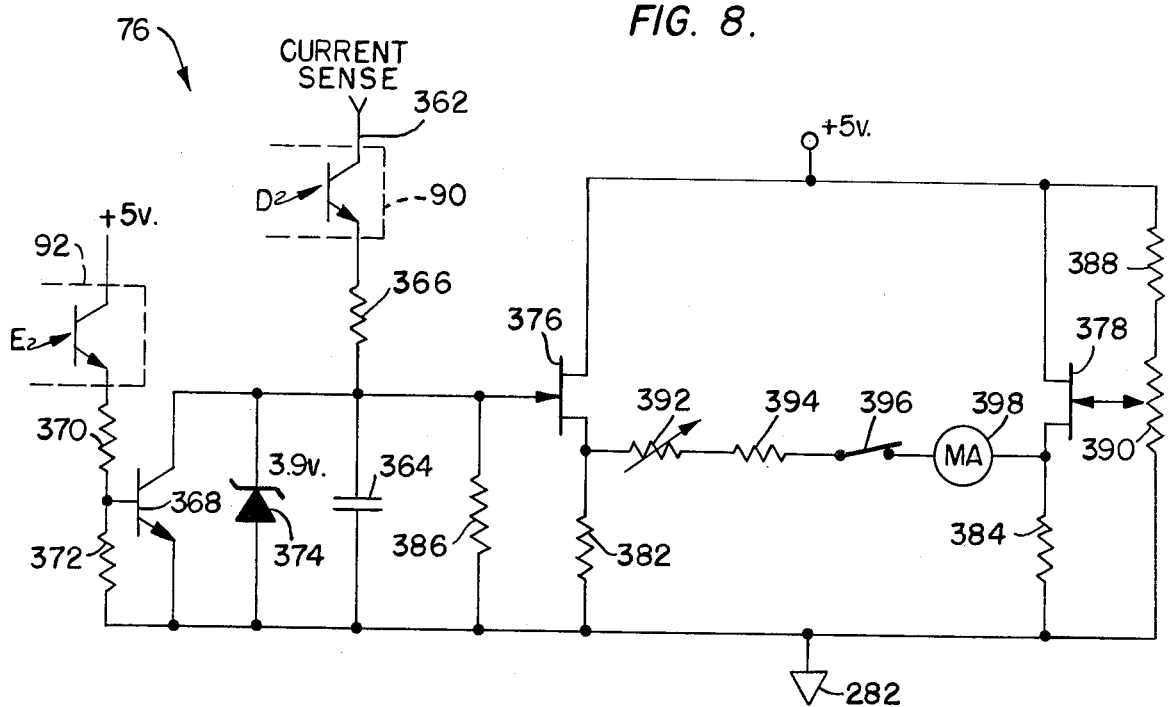
FIG. 8 is an electrical schematic diagram of the "lift indicator" circuitry of FIG. 3.

The lift indicator 76 circuit shown in FIG. 8 provides an indication of plunger lift by examining and integrating the controlled lift pulse portion of the current pulse with respect to time. By performing the integration only during the controlled energy pulse through a gating arrangement hereinafter described, and ignoring the boost pulse, a more accurate indication of actual rapper plunger lift results. It should be noted the lift indicator aspect of the rapper control system described herein is not the subject matter of the present invention but rather is the subject matter of the commonly-assigned co-pending application, Ser. No. 043,141, filed May 29, 1979, concurrently herewith by William W. Andrews, and entitled "ELECTROSTATIC PRECIPITATOR RAPPER CONTROL SYSTEM RAPPER PLUNGER LIFT INDICATOR."

The integration is accomplished by means of an integration circuit comprising a capacitor 364 and a resistor 366 supplied through the collector/emitter circuit of the output phototransistor of the optocoupler 90 from the Current Sense line 362. When the optocoupler 90 is enabled by means of the output pulse from the 145 ms one shot 180 (FIG. 4), the capacitor 364 is charged through the resistor 366 at a rate dependent upon the current through the current sensing resistor 284 (FIG. 6). More particularly, the capacitor 364 is charged through the resistor 366 from a voltage which is representative of rapper coil current. The optocoupler 90 and the circuitry of FIG. 4 which generates the D signal to activate the optocoupler 90 thus comprises a means for gating charging current to the capacitor 364 only during the pulse of controlled energy.

In order to discharge the capacitor 364 prior to each integration, the collector and emitter terminals of a switching transistor 368 are connected across the terminals of the capacitor 364. The base of the transistor 368 is supplied through a resistor 370 from the emitter of the output phototransistor of the optocoupler 92 which conveys the E infrared signal in coincidence with each $\overline{\text{TRIGGER}}$ pulse from the timer 128 of FIG. 4. A biasing resistor 372 is connected between the base of the transistor 368 and the second common circuit reference point 282. Lastly, a voltage limiting 3.9 volt Zener diode 374 is connected across the terminals of the capacitor 364.

The voltage on the capacitor 364 is sensed by a high input impedance bridge circuit comprising a pair of N-channel field effect transistors (FET's) 376 and 378.

The FET's 376 and 378 are connected in source follower configuration, with their drain terminals connected to a +5 volt terminal. Load resistors 382 and 384 are connected between the FET source terminals and the second common circuit reference point 282.

The gate of the FET 376 is connected directly to the capacitor 364, and additionally has a stabilizing resistor 386 connected between its gate terminal and the second circuit reference point 282. The gate of the FET 378 is connected to an adjustable voltage divider comprising a fixed resistor 388 and a potentiometer 390 connected between the +5 volt terminal and the second common circuit reference point 282.

To provide the actual lift indication, a milliammeter measuring circuit is connected between the source terminals of the FET's 376 and 378. This measuring circuit comprises a variable resistor 392 for span control, a fixed resistor 394, a switch 396 and a milliammeter 398, all connected in series.

Figure 9:
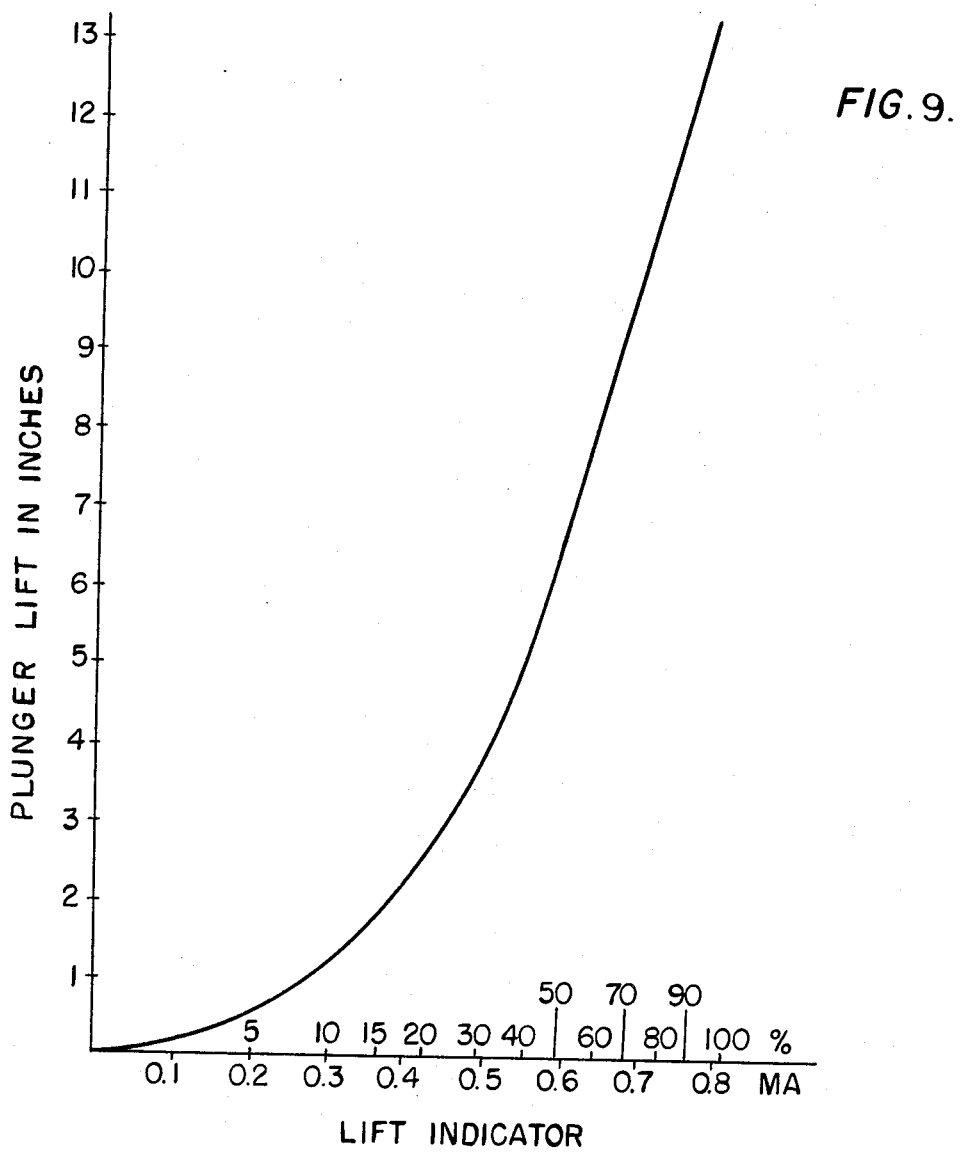
FIG. 9 is a graph relating indicated lift to actual plunger lift in inches for a typical rapper.

The characteristic of the particular lift indictor circuit 76 is represented by the curve of FIG. 9. From FIG. 9 the approximate plunger lift in inches can be determined from the indication on the milliammeter 398 at the end of an integration period. This indication remains until the lift indicator circuit 76 is reset at the beginning of the selection and actuation of the next rapper when $\overline{\text{TRIGGER}}$ goes low and the optocoupler 92 (FIGS. 4 and 8) is activated. Rather than express plunger lift in units of length, it may be more meaningful to express lift as a percentage of maximum lift. Thus the horizontal axis is labeled with both a milliampere (MA) scale and a percentage (%) scale. It will be appreciated that the face of the milliammeter 398 may readily bear either designation. It may also be seen from FIG. 9 that the characteristic is highly nonlinear below about 40%, but tends to be approximately linear thereabove.

The FIG. 9 characteristic curve is for a system having twenty pound (9.1 kg) rapper plungers with a maximum lift or displacement of fourteen inches (35.6 cm). However, it will be appreciated that such a curve may be empirically determined for any particular rapper size and displacement. One particular alternative rapper plunger size is eight pounds (3.6 kg), also having a lift or displacement of fourteen inches (35.6 cm). Even in this case, the % vs. MA values shown can be made to hold true through suitable RC timing changes.

ALARM CIRCUIT 74

The alarm circuit 74 of FIG. 10 serves to signal a malfunction, specifically either a short circuit or an open circuit, associated with the selected one of the rapper coils 32. As previously mentioned, the FIG. 10 alarm circuit 74 examines the current during at least a portion of the boost current pulse, which under normal (non-malfunction) conditions is substantially the same for each rapper in the system. An alarm signal is generated either if sensed boost pulse current is below a predetermined level indicative of an open circuit condition in the selected rapper coil 32 or in a electrical connection thereto, or if sensed boost pulse current is above a predetermined level indicative of a short circuit condition in the selected rapper coil 32 or in an electrical connection thereto. Expressed another way, current supplied to the rapper coil is sensed during at least a portion of the first energization pulse or boost pulse, and an alarm condition is signalled if the sensed current is outside of a predetermined range.

The FIG. 10 alarm circuit 74 has an output relay 400 which normally is energized when no malfunction exists. The output relay 400 has a set of contacts 402 which may be connected to external circuitry to accomplish any desired function. Another output of the alarm circuit is an indicating light emitting diode (LED) 404 which outputs visible light to signal an alarm condition.

The two inputs to the FIG. 10 alarm circuit 74 are the current sense line 362 from FIG. 6, and the infrared signal A conveyed by the optocoupler 84 from the FIG. 4 control logic. This signal serves to enable an undercurrent alarm portion of the circuitry during a selected portion of the boost pulse.

More specifically, the output portion of the FIG. 10 alarm circuit 74 comprises a normally non-conducting latching SCR 406 having its cathode connected to the second common circuit reference point 282 and its anode connected through a load resistor 408 and a normally closed "Reset" push button switch 410 to a +30 volt source terminal. The coil 414 of the output relay 400 has its lower terminal connected to the circuit reference point 282 and its upper terminal connected to the emitter of a driver transistor 416, with the collector of the driver transistor 416 connected to the junction of the load resistor 408 and an alarm "Reset" push button switch 410. To complete this portion of the circuit, a free-wheeling and protective diode 418 is connected across the relay coil 414, and a current limiting resistor 420 is connected in series with the LED 404, with this series combination connected across the collector/emitter terminals of the driver transistor 416. (The resistor 420 has sufficient resistance such that the current therethrough is insufficient to hold the output relay 400 in an energized condition.) A transient suppression capacitor 422 is connected between the gate and anode terminals of the latching SCR 406, with a biasing resistor 424 in parallel with the capacitor 422.

Under normal conditions, the latching SCR 406 is not conducting, and the driver transistor 416 is biased into conduction through the resistor 408. The relay coil 414 is therefore energized, and the collector/emitter voltage drop across the transistor 416 is insufficient to energize the LED 404. When the latching SCR 406 is gated ON, the base of the driver transistor 416 is pulled low, biasing the transistor 416 OFF. This deenergizes the output relay 400, and the voltage drop between the collector and the emitter of the now non-conducting transistor 416 causes the light emitting diode 404 to be energized. The latch SCR 406 remains conducting until such time as the alarm "Reset" push button switch 410 is operated.

The sensing portion of the FIG. 10 alarm circuit 74 has separate channels for the excessive current (short circuit) and insufficient current (open circuit) conditions. Both of these circuits are fed from the Current Sense line 362 through a common isolation diode 426.

For overcurrent sensing, the cathode of the isolation diode 426 is connected to the cathode of a 6.8 volt Zener diode 428 which does not conduct until the voltage on the current sense line 362 exceeds 6.8 volts (plus the forward voltage drop through the isolation diode 426). The Zener diode 428 is connected through a resistor 430 to the base of a switching transistor 432 connected in emitter follower configuration, with its collector terminal connected to the +5 volt terminal. A biasing resistor 434 is connected between the base and emitter terminals of the transistor 432. The emitter of the transistor 432 is connected directly to the gate of the latching SCR 406 to gate the SCR 406 into conduction when excessive rapper coil current flows.

The low current channel comprises an input transistor 436 connected in common emitter configuration with its base connected through a resistor 438 to the cathode of the isolation diode 426. A biasing resistor 440 connects the base and emitter terminals of the input transistor 436. Positive supply voltage is supplied to a line 442 of the low current channel through the output phototransistor of the optocoupler 84 and through a resistor 444 when the optocoupler 84 is activated.

A resistor 446 forms a voltage divider with the resistor 444 to limit the voltage on the line 442 when the transistor 436 is biased OFF, and a transient suppression capacitor 448 is connected across the resistor 446. To complete the low current channel, the line 442 is connected through an isolation diode 450 to the gate of the SCR 406.

In the operation of the low current channel, so long as the transistor 436 remains biased into conduction, the voltage on the line 442 is below that which gates on the latching SCR 406. If however the Current Sense line 362 voltage should drop below the predetermined level, then the transistor 436 turns OFF, and the latching SCR 406 is gated on through the resistor 444 and the isolation diode 450.

To prevent the low current channel being activated during those times when normally no rapper coil current flows because no rapper coil is being energized, the low current channel is enabled by the infrared signal A conveyed through the optocoupler 84 only during the boost pulse, or a portion thereof.

OPERATION OF THE SYSTEM

With particular reference to the FIG. 11 timing diagram, the overall operation of the system will now be described. In FIG. 4, the 60 Hz line carries a continuous 60 Hz square wave signal which synchronizes the remainder of the system. When the timer 128 generates a $\overline{\text{TRIGGER}}$ pulse, the $\overline{\text{TRIGGER}}$ line goes low for 20 ms. When $\overline{\text{TRIGGER}}$ goes low, the D input of the flip-flop 150 goes low, and the Q output which supplies the $\overline{\phi 1}$ clock pulse line goes low at the next low to high transistion of the 60 Hz line. $\overline{\phi 1}$ remains low until the first low to high transition of the 60 Hz line following the end of the $\overline{\text{TRIGGER}}$ pulse. With $\overline{\phi 1}$ low, the D input of the flip-flop 148 is low. Consequently the $\overline{Q}$ output thereof ($\phi 2$) goes high on the next succeeding low to high transition of the 60 Hz line. $\phi 2$ remains high until the first low to high transition of the 60 Hz signal following the end of the $\overline{\phi 1}$ clock phase pulse.

The 450 ms one shot 152 is not synchronized with the AC line frequency, being directly triggered by $\overline{\text{TRIG-GER}}$ to generate a logic low $\overline{F}$ pulse. The $\overline{F}$ pulse activates the optocoupler 94 (FIGS. 4 and 6) to enable the steering and lift control circuitry 66 of FIGS. 6 and 7. Additionally, $\overline{\text{COUNTER CLOCK}}$ goes low to increment the counter 222 of FIG. 5, selecting the next rapper in the particular sequence as determined by the programming of the PROM 228.

Also directly connected to the $\overline{\text{TRIGGER}}$ line is the infrared emitting diode of the optocoupler 92 which, when activated, resets the lift indicator 76 circuit of FIG. 8 by turning ON the transistor 368 and discharging the integrating capacitor 364.

When $\overline{\phi 1}$ goes low, it triggers the 167 ms one shot 162, which immediately generates a $\overline{B}$ signal to activate the optocoupler 86 (FIGS. 4 and 7). This allows the main power SCR's 56 and 58 to be gated into conduction, energizing the selected one of the rapper coils 32. Since $\overline{C}$ remains high, the optocoupler 88 (FIGS. 4 and 7) remains inactive, no current flows through the saturable reactor control windings 310 and 312, and full power results to produce the plunger boost pulse.

Figure 11:
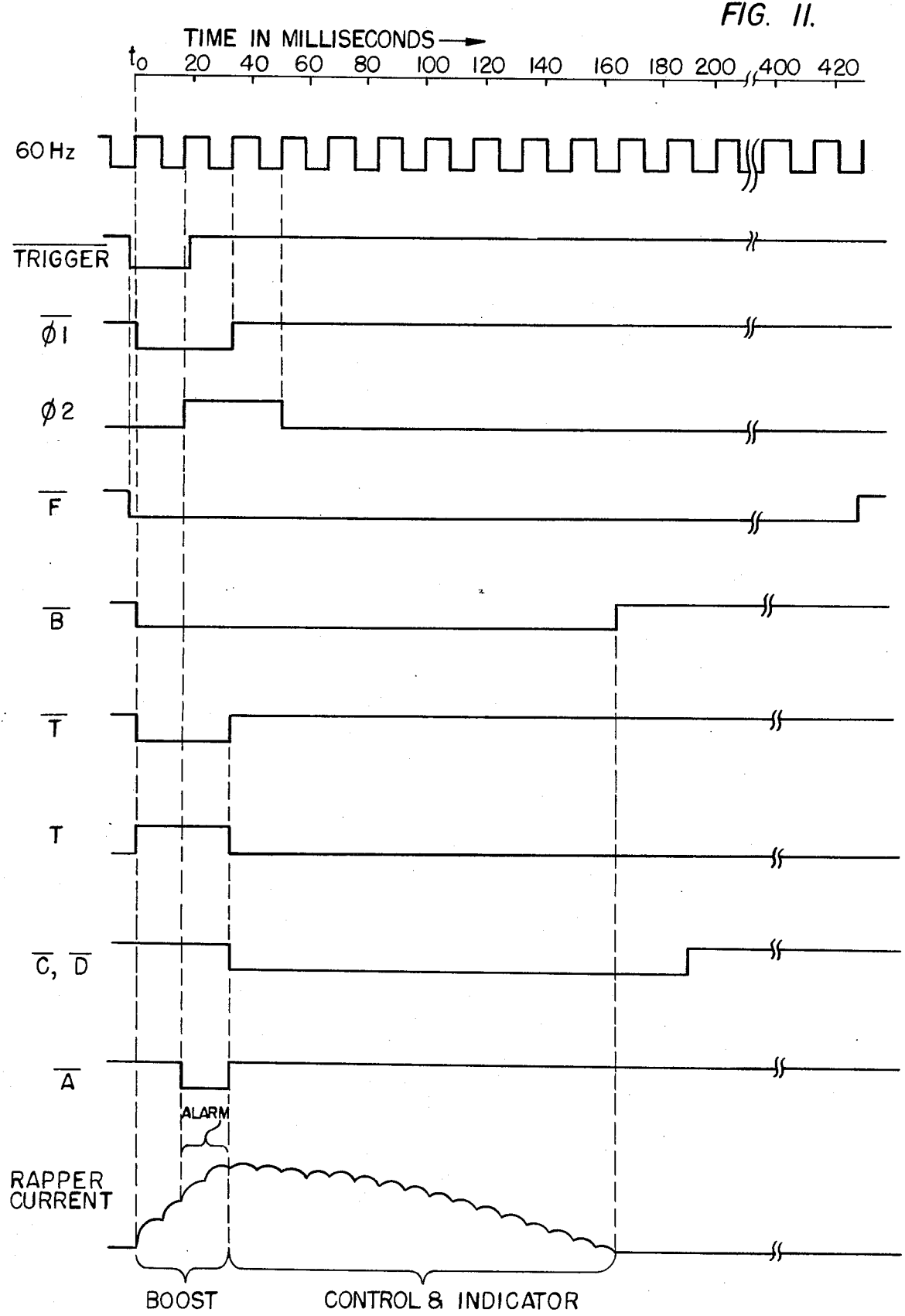
FIG. 11 is a timing diagram illustrating various signal states in the control system during a single rapper energization pulse, as well as the current waveform supplied to the energized rapper.

From the FIG. 11 waveforms and from the control circuit of FIG. 4 itself it can be seen that the beginning of the $\overline{B}$ pulse coincides with a low to high transition of the 60 Hz line. This ensures that the initial energization of the selected rapper coil occurs for a complete AC half-cycle, resulting in more precise control over the boost pulse power.

At the same time the $\overline{\phi 1}$ pulse triggers the 167 ms one shot 162, it also triggers the 37 ms one shot 172. The 37 ms one shot 172 has three functions: (1) to delay the start of the control portion of the rapper energization pulse $\overline{C}$, thereby establishing the length of the boost pulse; to similarly control the time of initiating the $\overline{D}$ pulse for the lift indicator circuitry 76; and (3) to produce a T pulse which, together with $\phi 2$, activates the NAND gate 194 ($\overline{A}$ goes low) to activate the optocoupler 84 (FIGS. 4 and 10) which enables the low current channel of the FIG. 10 alarm circuit 74.

At the end of the 37 ms pulse from the one shot 172, T goes high, triggering the 145 ms one shot 180. This causes $\overline{C}$ and $\overline{D}$ to go low, activating the optocoupler 88 (FIGS. 4 and 7) causing the SCR phase control to reduce the power according to the selected one of the variable resistors 304 (FIG. 6), and activating the optocoupler 90 (FIGS. 4 and 8) to enable the lift indicator circuitry of FIG. 8.

Upon the termination of the $\overline{B}$ pulse from the 167 ms one shot 162, the optocoupler 86 (FIGS. 4 and 7) is again inactive, causing the SCR power control circuitry of FIG. 7 to shut off the main power control SCR.

Relating the above description of the system and its operation to the functional block diagram of FIG. 3, the FIG. 3 "Gate Boost Pulse" line 62 which directs the SCR phase control gate drive circuit 60 to gate the main power SCR's 56 and 58 into supplying the first energization pulse which has a predetermined relatively high power level and a predetermined duration sufficient to overcome initial plunger sticking forces and to displace the selected rapper plunger 36 from its impact and resting position may, in the specific embodiment illustrated, be seen to comprise that portion of the circuitry which causes $\overline{B}$ to go low, activating the optocoupler 86 (FIGS. 4 and 7) to energize the FIG. 7 gate drive circuit 60 by biasing the switching transistor 350 into conduction, and which at the same time holds $\overline{C}$ high so that the optocoupler 88 (FIGS. 4 and 7) is not activated and no current through either of the saturable reactor control windings 310 and 312. With no current through the control windings 310 and 312, the conduction angles of the power SCR's 56 and 58 are at a maximum for their respective conduction half cycles. Thus the first energization pulse, also herein termed the boost pulse, comprises a predetermined number of complete AC current half-cycles. The actual number of AC current half-cycles is determined by the number which occur during the time interval between the beginning of the $\overline{B}$ pulse and the beginning of the $\overline{C}$ pulse which causes the saturable reactor control windings 310 and 312 to be energized. In the illustrated embodiment this time interval is 37 milliseconds, which allows approximately four and one-half complete AC current half-cycles (at 60 Hz) to occur.

The FIG. 3 "Gate Control Pulse" line 64 which directs the SCR phase control gate drive circuit 60 to gate the main power SCR's 56 and 58 into supplying the second energization pulse which has an energy level sufficient to further displace the selected rapper plunger 36 to a desired position may, in the specific embodiment illustrated, be seen that portion of the circuitry which causes $\overline{C}$ to go low, activating the optocoupler 88 (FIGS. 4 and 7) to energize the saturable reactor control windings 310 and 312, and which at the same time keeps $\overline{B}$ low so that the switching transistor 350 of the FIG. 7 gate drive circuit 60 remains conducting. Thus the second energization pulse, also herein termed the control pulse or pulse of controlled energy, comprises a substantially fixed number of conduction angle controlled AC current half-cycles. The actual number of conduction angle controlled AC current half-cycles is determined by the number which occur during the time interval between the beginning of the $\overline{C}$ pulse and the end of the $\overline{B}$ pulse. In the illustrated embodiment, this time interval is 130 milliseconds (167 ms minus 37 ms), which allows approximately fifteen and one-half conduction angle controlled AC current half-cycles to occur. The actual conduction angle during these conduction angle controlled half-cycles is determined by the current through the saturable reactor control windings 310 and 312, which in turn depends upon the resistance value of whichever one of the rapping intensity selecting variable resistors 304 (FIG. 6) is connected to an active one of the rapper select lines 266. These variable resistors 304 permit individual selective control over rapper plunger displacements. It will thus be appreciated that the FIG. 3 line 70 representing the function of supplying information to the SCR phase concerning how much energy should be in the lift or control pulse for the particular enabled rapper comprises, in the specific embodiment illustrated, the output of the FIG. 6 terminal 302 connected to the FIG. 7 saturable reactor control winding 310.

The FIG. 3 line 68 representing the function of enabling a particular one of the rapper coils 32 to be energized via the pair 54 of main power SCR's 56 and 58 generally comprises, in the specific embodiment illustrated, the FIG. 6 optocoupler 268 and the power steering SCR's 274. The related FIG. 3 "Rapper Select" line 72 may, in the specific embodiment illustrated, be seen to generally comprise the Rapper Select Circuitry which was described above with particular reference to FIGS. 5 and 6. This circuitry selects or enables a particular one of the system rappers (by bank and individual rapper number) for energization.

Lastly, the FIG. 3 "Gate Alarm" and "Gate Indicator" lines 80 and 82 respectively generally comprise, in the specific embodiment illustrated, the infrared signal A conveyed via the optocoupler 84 (FIGS. 4 and 10) which enables the lower current alarm circuit channel during at least a portion of the boost pulse, and the infrared signal D conveyed via the optocoupler 90 (FIGS. 4 and 8) which enables the lift indicator circuit 76 during the control pulse.

COMPONENT VALUES AND MODIFICATIONS

For the purpose of enabling one of ordinary skill in the art to practice the invention with a minimum of experimentation, the following TABLE II presents component values suitable for use in the circuits described herein. It will be appreciated that these values are exemplary only and are not intended to limit the scope of the claimed invention.

TABLE II

| | Resistors |
|---|---|
| 97, 270 | 220 Ohms |
| 112, 114, 202, 214, 301, 372 | 2.2 K Ohms |
| 118, 120, 408 | 4.7 K Ohms |
| 132 | 2 Meg Ohm variable |
| 134 | 47 K Ohms |
| 142 | 20 K Ohms, approximately. Trim for 22 ms pulse. |
| 156 | 27 K Ohms |
| 166 | 15 K Ohms, approximately. Trim for 167 ms B pulse |
| 176 | 3.3 K Ohms, approximately. Trim for 37 ms T pulse |
| 184, 318, 388, 434, 440, 446 | 10 K Ohms |
| 230, 255, 336, 353, 366, 430, 438, 444 | 1 K Ohms |
| 279a | 50 Ohms |
| 279d | 20 Ohms |
| 284 | 0.2 Ohms |
| 286 | 50 Ohms |
| 296 | 100 Ohms, 5 Watts |
| 298, 370 | 390 Ohms |
| 304, 392 | 2 K Ohms variable |
| 314 | 100 Ohms |
| 316, 420 | 1.5 K Ohms |
| 319 | 10 K Ohms variable |
| 348 | 6.2 Ohms |
| 358 | 150 Ohms |
| 360 | 18 K Ohms |
| 382, 384 | 560 Ohms |
| 386 | 5.6 Meg Ohms |
| 390 | 2 K Ohms potentiometer |
| 277, 394, 424 | 470 Ohms |
| | Capacitors |
| 136, 158, 168, 178, 186 | 20 mfd. |
| 140 | 1.5 mfd. |
| 204, 216, 364 | 100 mfd. |
| 279b, 288 | 0.05 mfd. |
| 332 | 50 mfd. |
| 448 | 10 mfd. |
| 422 | 0.22 mfd. |
| | Semiconductor Devices |
| 56, 58 | C35M SCR |
| 108, 110, 432, 436 | 2N5449 Transistor |
| 144, 206, 208, 210, 218, 220 272, 328, 330, 340, 342, 344 346, 356, 418 | 1N4003 Silicon Diode |
| 122, 124, 194, 238 | Each is one-fourth of a Texas Instruments Type No. SN7400 quad 2-input NAND gate integrated circuit |
| 148, 150 | Each is one-half of a Texas Instruments Type No. SN7474 dual D-Type flip-flop |
| 160, 170, 188, 190, 192, 254, 264 | Each is one-sixth of a Texas Instruments Type No. SN7417 Hex Buffer/Driver with open collector output |
| 236 | Texas Instruments Type No. SN7430 8-input NAND gate |
| 274 | G.E. Type No. C230C2 SCR |
| 279d | 1N450 Diode |
| 300, 350, 368, 416 | 2N7270 Transistor |
| 376, 378 | Type No. TIS74 FET |
| 406 | Type No. MCR 10-3 SCR |
| 426, 450 | Two 1N4003 diodes in series |

The system described above is for controlling rappers having twenty pound (9.1 kg) plungers. In the event the system is employed to control rappers having eight pound (3.6 kg) plungers, several of the timing components should be changed. Specifically, the timing of the one shot 162 (FIG. 4) which generates the B̄ signal should be shortened to 100 ms and the timing of the one shot 172 which generates the T̄ delay pulse should be shortened to 20 ms. Thus the first rapper energization pulse or boost pulse would be 20 ms, while the second rapper energization or control pulse would be 80 ms (100 ms minus 20 ms).

While a specific embodiment of the invention has been illustrated herein, it is realized that modifications and changes will occur to those skilled in the art. It is therefore to be understood that the appended claims are intended to cover all such modifications and changes as fall within the true spirit and scope of the invention.

What is claimed is:

1. In a system for controlling an electrostatic precipitator rapper of the type having a movable plunger biased towards an impact and resting position and having electromagnetic means for displacing the plunger away from the impact and resting position and then releasing the plunger, rapping intensity depending upon plunger displacement before release, said system including means for supplying to the electromagnetic means an electrical energy pulse of controlled energy for displacing the rapper plunger to a desired position, the improvement which comprises:

means for supplying to the electromagnetic means immediately prior to the pulse of controlled energy an electrical energy boost pulse having a predetermined relatively high power level and predetermined duration sufficient to overcome plunger initial sticking forces and to just slightly displace the rapper plunger from its impact and resting position, thereby enhancing the accuracy of displacement control effected by the pulse of controlled energy.

2. A system according to claim 1, which operates from a source of AC power and wherein the boost pulse comprises a predetermined number of substantially complete AC current half-cycles.

3. A system according to claim 2, wherein the pulse of controlled energy comprises a substantially fixed number of conduction angle controlled AC current half-cycles.

4. A system according to claim 1, wherein the pulse of controlled energy comprises a substantially fixed number of conduction angle controlled AC current half-cycles.

5. A system according to claim 1, which further comprises alarm circuitry for signaling a malfunction associated with the electromagnetic plunger displacing means, said alarm circuitry including:

means for sensing the current supplied to the electromagnetic means during at least a portion of the boost pulse; and means for generating an alarm signal when the sensed current is above a predetermined level indicative of a short circuit condition in the electromagnetic means or in an electrical connection thereto.

6. A system according to claim 1, which further comprises an alarm circuitry for signaling a malfunction associated with the electromagnetic plunger displacing means, said alarm circuitry including:

means for sensing the current supplied to the electromagnetic means during at least a portion of the boost pulse; and means for generating an alarm signal when the sensed current is below a predetermined level indicative of an open circuit condition in the electromagnetic means or in an electrical connection thereto.

7. A system according to claim 6, wherein said alarm circuitry further includes means for generating an alarm signal when the sensed current is above a predetermined level indicative of a short circuitry condition in the electromagnetic means or in a electrical connection thereto.

8. A rapper control system for an electrostatic precipitator including a rapper of the type having a movable plunger biased towards an impact and resting position and having electromagnetic means for displacing the plunger away from the impact and resting position, rapping intensity depending upon the distance of plunger displacement before release, said control sytem comprising:
   means for supplying the rapper electromagnetic means with two distinct energization pulses;
   the first energization pulse having a predetermined relatively high power level and a predetermined duration sufficient to overcome initial plunger sticking forces and to displace the rapper plunger from its impact and resting position; and
   the second energization pulse immediately following the first energization pulse and having an energy level sufficient to further displace the rapper plunger to a desired position, the second energization pulse providing accurate rapping intensity control.

9. A rapper control system according to claim 8, which operates from a source of AC power and wherein the first energization pulse comprises a predetermined number of substantially complete AC current half-cycles.

10. A rapper control system according to claim 9, wherein the energy of the second energy pulse is selectively controlled to achieve a desired plunger displacement.

11. A rapper control system according to claim 10, wherein the second energization pulse comprises a substantially fixed number of conduction angle controlled AC current half-cycles.

12. A rapper control system according to claim 8, wherein the energy of the second energization pulse is controlled to achieve a desired plunger displacement.

13. A rapper control system according to claim 12, which operates from a source of AC power and wherein the second energization pulse comprises a substantially fixed number of conduction angle controlled AC current half-cycles.

14. A rapper control system according to claim 8, which further comprises alarm circuitry for indicating a malfunction associated with the electromagnetic plunger displacing means, said alarm circuitry including:
   means for sensing the current supplied to the electromagnetic means during at least a portion of the first energization pulse; and
   means for generating an alarm signal when the sensed current is below a predetermined level indicative of an open circuit condition in the electromagnetic means or a connection thereto.

15. A rapper control system according to claim 14, wherein said alarm circuitry further includes means for generating an alarm signal when the sensed current is above a predetermined level indicative of a short circuit condition in the electromagnetic means or a connection thereto.

16. A rapper control system according to claim 8, which further comprises alarm circuitry for indicating a malfunction associated with the electromagnetic plunger displacing means, said alarm circuitry including:
   means for sensing the current supplied to the electromagnetic means during at least a portion of the first energization pulse; and
   means for generating an alarm signal when the sensed current is above a predetermined level indicative of a short circuit condition in the electromagnetic means or a connection thereto.

17. A rapper control system for a electrostatic precipitator including a plurality of rappers of the type having a movable plunger biased towards an impact and resting position and having electromagnetic means for displacing the plunger away from the impact and resting position, rapping intensity depending upon the distance of plunger displacement before release, said control system comprising:
   a digital counter having a plurality of states representative of individual rappers;
   decoding means connnected to the output of said digital counter for enabling the individual rapper corresponding to each of the representative counter states;
   power control means connected to supply the enabled rapper; and
   control logic means for periodically incrementing said digital counter to enable successive rappers and for directing said power control means to first establish a boost pulse by supplying relatively high power to the enabled rapper for a predetermined duration sufficient to overcome initial plunger sticking forces and to just slightly displace the enabled rapper plunger from its impact and resting position, and to the establish a pulse of controlled energy by supplying power to the enabled rapper sufficient to further displaced the plunger of the enabled rapper to a desired position.

18. A rapper control system according to claim 17, wherein said decoding means includes programmable means for altering the particular rapper corresponding to each representative counter state, thereby facilitating the programming of any desired energization sequence of the rappers.

19. A rapper control system according to claim 17, which operates from a source of AC power, and wherein the boost pulse comprises a predetermined number of substantially complete AC current half-cycles.

20. A rapper control system according to claim 19, wherein the energy of the pulse of controlled energy is selectively controlled to achieve a desired plunger displacement.

21. A rapper control system according to claim 20, wherein said power control means is capable of controlling the conduction angle during each AC current half-cycle, and wherein the controlled energy pulse comprises a substantially fixed number of conduction angle controlled AC current half-cycles.

22. A rapper control system according to claim 17, wherein the energy of the pulse of controlled energy is selectively controlled to achieve a desired plunger displacement.

23. A rapper control system according to claim 22, which operates from a source of AC power, wherein said power control means is capable of controlling the conduction angle during each AC current half-cycle, and wherein the controlled energy pulse comprises a substantially fixed number of conduction angle controlled AC current half-cycles.

24. A rapper control system according to claim 17, which further comprises alarm circuitry for signaling a malfunction associated the electromagnetic plunger displacing means of the enabled rapper, said control logic means enabling said alarm circuitry during at least a portion of each boost pulse, and said alarm circuitry comprising:
   means for sensing the current supplied to the electromagnetic means; and
   means for generating an alarm signal when the sensed current is below a predetermined level indicative of an open circuit condition in the electromagnetic means or in a electrical connection thereto.

25. A rapper control system according to claim 24, wherein said alarm circuitry further includes means for generating an alarm signal when the sensed current is above a predetermined level indicative of a short circuit condition in the electromagnetic means or in a electrical connection thereto.

26. A method of operating an electrostatic precipitator rapper to achieve accurate control of rapping intensity, the rapper being of the type having a plunger and an electromagnetic coil for displacing the plunger, rapping intensity depending upon plunger displacement, said method comprising:
   supplying the rapper coil with a first energization pulse of relatively high power level and of duration sufficient to overcome initial unpredictable rapper plunger sticking forces and to displace the rapper plunger from its resting position; and
   then immediately supplying the rapper coil with a second energization pulse having energy sufficient to further displace the rapper plunger to a desired position.

27. A method according to claim 26, further comprising the step of controlling the energy of the second energization pulse to achieve a desired plunger displacement and resultant rapping intensity.

28. A method according to claim 26, which further comprises the steps of sensing the current supplied to the rapper coil during at least a portion of the first energization pulse and signalling an alarm condition if the sensed current is outside of a predetermined range.

* * * * *